(12) United States Patent
Zhao

(10) Patent No.: US 11,818,075 B2
(45) Date of Patent: Nov. 14, 2023

(54) COMMUNICATION FEEDBACK METHOD AND APPARATUS, DEVICE AND STORAGE MEDIUM

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 297 days.

(21) Appl. No.: 17/419,624

(22) PCT Filed: Dec. 29, 2018

(86) PCT No.: PCT/CN2018/125824
§ 371 (c)(1),
(2) Date: Jun. 29, 2021

(87) PCT Pub. No.: WO2020/133503
PCT Pub. Date: Jul. 2, 2020

(65) Prior Publication Data
US 2022/0085955 A1   Mar. 17, 2022

(51) Int. Cl.
*H04L 5/00* (2006.01)
*H04W 24/08* (2009.01)
*H04W 24/10* (2009.01)
*H04W 72/30* (2023.01)

(52) U.S. Cl.
CPC .......... *H04L 5/0055* (2013.01); *H04W 24/08* (2013.01); *H04W 24/10* (2013.01); *H04W 72/30* (2023.01)

(58) Field of Classification Search
CPC ................ H04L 5/0055; H04L 5/0094; H04L 2001/0093; H04L 1/1864; H04W 24/08; H04W 24/10; H04W 72/30; H04W 4/46
See application file for complete search history.

(56) References Cited

U.S. PATENT DOCUMENTS

| | | | |
|---|---|---|---|
| 2014/0198710 A1* | 7/2014 | Herrmann | H04L 1/1692 370/312 |
| 2015/0215929 A1* | 7/2015 | Damnjanovic | H04W 72/21 370/241 |
| 2018/0014163 A1* | 1/2018 | Herrmann | H04W 52/48 |
| 2019/0342891 A1* | 11/2019 | Asterjadhi | H04W 72/21 |
| 2020/0008095 A1* | 1/2020 | Patil | H04W 12/03 |
| 2020/0169962 A1* | 5/2020 | Fakoorian | H04L 1/1858 |

* cited by examiner

*Primary Examiner* — Dady Chery
(74) *Attorney, Agent, or Firm* — COZEN O'CONNOR

(57) ABSTRACT

The disclosure provides a communication feedback method including the following. A target subset is determined from a set of multicast receiving devices. A first control signaling is transmitted. The first control signaling is for instructing the target multicast receiver in the target subset to employ a first feedback mode. The first feedback mode is for feeding an ACK back when communication data transmitted by the multicast transmitter is received correctly and for feeding a NACK back when communication data transmitted by the multicast transmitter is not received correctly. The first control signaling is for instructing other multicast receivers outside the target subset to employ a second feedback mode. The second feedback mode is for not feeding back when communication data transmitted by the multicast transmitter is received correctly and for feeding the NACK back when communication data transmitted by the multicast transmitter is not received correctly.

20 Claims, 6 Drawing Sheets

COMMUNICATION FEEDBACK METHOD AND APPARATUS, DEVICE AND STORAGE MEDIUM

CROSS-REFERENCE TO RELATED APPLICATION

This application is a national phase of International Application No. PCT/CN2018/125824, filed on Dec. 29, 2018, the entire contents of which are incorporated herein by reference.

TECHNICAL FIELD

The disclosure relates to the field of communication technologies, and more particularly, to a communication feedback method and apparatus, a device and a storage medium.

BACKGROUND

Current wireless communication systems may support direct communication among devices with the development of wireless communication technologies and Internet of Vehicles (IoV) communication technologies. The direct communication mode may have characteristics of a short delay and a low signaling overhead, which is very suitable for communication between a device and other surrounding devices. The direct communication mode may also support multicast communication and HARQ (Hybrid Automatic Repeat Request) mechanism. That is, the HARQ mechanism may be implemented when the multicast communication may be performed among a transmitter and a plurality of receivers.

A multicast transmitter may transmit communication data to the plurality of multicast receivers through a certain resource, and also transmit SCI (Sidelink Control Information) associated with the communication data to the plurality of multicast receivers. The SCI carries the resource. For each of the plurality of multicast receivers, when the multicast receiver receives the SCI, the resource is determined, and the communication data are received based on the resource. When the multicast receiver does not correctly receive the communication data, the multicast receiver may feed a NACK (Non-acknowledgement, negative acknowledgement character) back to the multicast transmitter. When the multicast receiver correctly receives the communication data, the multicast receiver may not feed any information back to the multicast transmitter in order to reduce the signaling overhead. For the multicast transmitter, when the multicast transmitter receives the NACK and determines that a transmission of the communication data has failed, the communication data are retransmitted. When the multicast transmitter does not receive the NACK, the transmission of the communication data are considered to be successful and the communication data are not retransmitted.

However, when the multicast receiver does not correctly receive the SCI, the multicast receiver also may not feed any information back to the multicast transmitter. At this time, the multicast transmitter may not receive the NACK, mistakenly believe that the transmission of the communication data are successful, and not retransmit the communication data. Therefore, the above solution may cause the loss of the communication data and reduce the transmission reliability.

SUMMARY

The disclosure provides a communication feedback method and apparatus, a device and a storage medium, which may solve related technical problems. The technical solutions may be as follows.

According to a first aspect of embodiments of the disclosure, there is provided a communication feedback method. The method may be applicable to a transmitter. The method may include the following.

A target subset is determined from a set of multicast receiving devices. The set of multicast receiving devices may include a plurality of multicast receivers that receive multicast communication. The target subset may include at least one target multicast receiver in the plurality of multicast receivers.

A first control signaling is transmitted. The first control signaling may be for instructing the target multicast receiver in the target subset to employ a first feedback mode to give feedback. The first feedback mode may be for feeding an acknowledgement character ACK back when communication data transmitted by the multicast transmitter is received correctly and for feeding a negative acknowledgement character NACK back when communication data transmitted by the multicast transmitter is not received correctly.

The first control signaling may be further for instructing other multicast receivers outside the target subset to employ a second feedback mode to give feedback. The second feedback mode may be for not feeding back when communication data transmitted by the multicast transmitter is received correctly and for feeding the NACK back when communication data transmitted by the multicast transmitter are not received correctly.

In a possible implementation, the transmitting the first control signaling may include the following.

The first control signaling is transmitted to each target multicast receiver in the target subset. The first control signaling may be for instructing to employ the first feedback mode.

Or the first control signaling is multicasted to the plurality of multicast receivers. The first control signaling may carry a device identifier of the target multicast receiver in the target subset.

In another possible implementation, the first control signaling may carry resource indication information. The resource indication information may be for indicating a first resource for the at least one target multicast receiver to transmit feedback information.

In another possible implementation, the resource indication information may include the first resource for the at least one target multicast receiver to transmit feedback information.

Or the resource indication information may include an offset between the first resource and a designated resource, the designated resource being a second resource for the multicast transmitter to transmit communication data, or may include a third resource for other multicast receiver to transmit feedback information.

In another possible implementation, first resources for different target multicast receivers to transmit feedback information are orthogonal.

In another possible implementation, the first resource for the target multicast receiver to transmit feedback information is orthogonal to the third resource for the other multicast receiver to transmit feedback information.

In another possible implementation, third resources for other multicast receivers to transmit feedback information are the same.

In another possible implementation, the determining the target subset from the set of multicast receiving devices may include the following.

The at least one target multicast receiver whose channel quality with the multicast transmitter is lower than that of other multicast receivers or a preset channel quality and whose number does not exceed a preset number is selected from the set of multicast receiving devices, to add to the target subset.

In another possible implementation, the selecting the at least one target multicast receiver whose channel quality with the multicast transmitter is lower than that of other multicast receivers or the preset channel quality and whose number does not exceed the preset number to add to the target subset, may include the following.

A channel quality report signaling transmitted by at least one multicast receiver of the plurality of multicast receivers is received. The channel quality report signaling may carry a channel quality between the corresponding multicast receiver and the multicast transmitter.

Or a channel quality between each of the plurality of multicast receivers and the multicast transmitter is measured.

The at least one target multicast receiver whose channel quality with the multicast transmitter is lower than that of other multicast receivers or a first preset channel quality and whose number does not exceed the preset number is selected based on the acquired channel quality to add to the target subset.

In another possible implementation, the method further includes the following.

The preset number or the first preset channel quality predefined in a preset protocol is acquired.

Alternatively, a second control signaling transmitted by a base station is received. The second control signaling may carry the preset number, or the second control signaling may carry the first preset channel quality.

In another possible implementation, any one of the plurality of multicast receivers is configured to transmit a channel quality report signaling to the multicast transmitter when a channel quality with the multicast transmitter is lower than a second preset channel quality. The channel quality report signaling may carry the channel quality.

The selecting the at least one target multicast receiver whose channel quality with the multicast transmitter is lower than that of other multicast receivers or the preset channel quality and whose number does not exceed the preset number to add to the target subset, includes the following.

A channel quality report signaling transmitted by at least one multicast receiver of the plurality of multicast receivers is received.

A multicast receiver that does not exceed the preset number in the at least one multicast receiver is added to the target subset.

According to a second aspect of embodiments of the disclosure, there is provided a communication feedback method. The method may be applicable to a multicast receiver. The method may include the following.

A first control signaling transmitted by a multicast transmitter is received when a second feedback mode is employed by default to give feedback.

A first feedback mode or the second feedback mode is employed to give feedback based on the first control signaling.

The first control signaling may be for instructing a target multicast receiver in a target subset to employ the first feedback mode to give feedback. The first feedback mode may be for feeding an acknowledgement character ACK back when communication data transmitted by the multicast transmitter is received correctly and for feeding a negative acknowledgement character NACK back when communication data transmitted by the multicast transmitter is not received correctly.

The first control signaling may be further for instructing other multicast receivers outside the target subset to employ the second feedback mode to give feedback. The second feedback mode may be for not feeding back when communication data transmitted by the multicast transmitter is received correctly and for feeding the NACK back when communication data transmitted by the multicast transmitter is not received correctly.

In a possible implementation, the employing the first feedback mode or the second feedback mode to give feedback based on the first control signaling includes the following.

The first feedback mode is employed to give feedback when the first control signaling is a unicast signaling transmitted by the multicast transmitter.

The employing the first feedback mode or the second feedback mode to give feedback based on the first control signaling includes the following.

The first feedback mode is employed to give feedback when the first control signaling is a multicast signaling transmitted by the multicast transmitter and the first control signaling carries a device identifier of the multicast receiver.

The second feedback mode is employed to give feedback when the first control signaling is the multicast signaling transmitted by the multicast transmitter and the first control signaling does not carry the device identifier of the multicast receiver.

In another possible implementation, the first control signaling may carry resource indication information. The resource indication information may be for indicating a first resource for the target multicast receiver to transmit feedback information. The employing the first feedback mode to give feedback includes the following.

The ACK is transmitted through the first resource when communication data transmitted by the multicast transmitter is correctly received.

The NACK is transmitted through the first resource when communication data transmitted by the multicast transmitter is not correctly received.

In another possible implementation, the resource indication information may include an offset between the first resource for the target multicast receiver to transmit feedback information and a designated resource, the designated resource being a second resource for the multicast transmitter to transmit communication data, or may include a third resource for other multicast receiver to transmit feedback information. The method further includes the following.

The first resource is determined based on the designated resource and the offset.

In another possible implementation, first resources for different target multicast receivers to transmit feedback information are orthogonal.

In another possible implementation, the first resource for the target multicast receiver to transmit feedback information is orthogonal to the third resource for the other multicast receiver to transmit feedback information.

In another possible implementation, third resources for other multicast receivers to transmit feedback information are the same.

In another possible implementation, the method further includes the following.

A channel quality between the multicast receiver and the multicast transmitter is measured.

A channel quality report signaling is transmitted to the multicast transmitter. The channel quality report signaling may carry the channel quality.

Or a channel quality report signaling is transmitted to multicast transmitter when the channel quality is lower than a second preset channel quality. The channel quality report signaling may carry the channel quality.

In another possible implementation, the method further includes the following.

A third control signaling transmitted by a base station is received. The third control signaling may carry the second preset channel quality.

Or a fourth control signaling transmitted by the multicast transmitter is received. The fourth control signaling may carry the second preset channel quality.

According to a third aspect of embodiments of the disclosure, there is provided a communication feedback apparatus. The apparatus may be applicable to a multicast receiver. The apparatus may include a target determining module and a transmitting module.

The target determining module is configured to determine a target subset from a set of multicast receiving devices. The set of multicast receiving devices may include a plurality of multicast receivers that receive multicast communication. The target subset may include at least one target multicast receiver in the plurality of multicast receivers.

The transmitting module is configured to transmit a first control signaling. The first control signaling may be for instructing the target multicast receiver in the target subset to employ a first feedback mode to give feedback. The first feedback mode may be for feeding an acknowledgement character ACK back when communication data transmitted by the multicast transmitter is received correctly and for feeding a negative acknowledgement character NACK back when communication data transmitted by the multicast transmitter is not received correctly.

The first control signaling may be further for instructing other multicast receivers outside the target subset to employ a second feedback mode to give feedback. The second feedback mode may be for not feeding back when communication data transmitted by the multicast transmitter is received correctly and for feeding the NACK back when communication data transmitted by the multicast transmitter is not received correctly.

In a possible implementation, the transmitting module includes a first transmitting unit and a second transmitting unit.

The first transmitting unit is configured to transmit the first control signaling to each target multicast receiver in the target subset. The first control signaling may be for instructing to employ the first feedback mode.

The second transmitting unit is configured to multicast the first control signaling to the plurality of multicast receivers. The first control signaling may carry a device identifier of the target multicast receiver in the target subset.

In another possible implementation, the first control signaling may carry resource indication information. The resource indication information may be for indicating a first resource for the at least one target multicast receiver to transmit feedback information.

In another possible implementation, the resource indication information may include the first resource for the at least one target multicast receiver to transmit feedback information.

Or the resource indication information may include an offset between the first resource and a designated resource, the designated resource being a second resource for the multicast transmitter to transmit communication data, or may include a third resource for other multicast receiver to transmit feedback information.

In another possible implementation, first resources for different target multicast receivers to transmit feedback information are orthogonal.

In another possible implementation, the first resource for the target multicast receiver to transmit feedback information is orthogonal to the third resource for the other multicast receiver to transmit feedback information.

In another possible implementation, third resources for other multicast receivers to transmit feedback information are the same.

In another possible implementation, the target determining module is configured to select from the set of multicast receiving devices the at least one target multicast receiver whose channel quality with the multicast transmitter is lower than that of other multicast receivers or a preset channel quality and whose number does not exceed a preset number, to add to the target subset.

In another possible implementation, the target determining module includes an acquiring unit and a target determining unit.

The acquiring unit is configured to receive a channel quality report signaling transmitted by at least one multicast receiver of the plurality of multicast receivers, the channel quality report signaling carrying a channel quality between the corresponding multicast receiver and the multicast transmitter; or measure a channel quality between each of the plurality of multicast receivers and the multicast transmitter.

The target determining unit is configured to select based on the acquired channel quality the at least one target multicast receiver whose channel quality with the multicast transmitter is lower than that of other multicast receivers or a first preset channel quality and whose number does not exceed the preset number to add to the target sub set.

In another possible implementation, the apparatus further includes an acquiring module.

The acquiring module is configured to acquire the preset number or the first preset channel quality predefined in a preset protocol.

The acquiring module is further configured to receive a second control signaling transmitted by a base station. The second control signaling may carry the preset number, or the second control signaling may carry the first preset channel quality.

In another possible implementation, any one of the plurality of multicast receivers is configured to transmit a channel quality report signaling to the multicast transmitter when a channel quality with the multicast transmitter is lower than a second preset channel quality. The channel quality report signaling may carry the channel quality.

The target determining module includes a receiving unit and a target determining unit.

The receiving unit is configured to receive a channel quality report signaling transmitted by at least one multicast receiver of the plurality of multicast receivers.

The target determining unit is configured to add a multicast receiver that does not exceed the preset number in the at least one multicast receiver to the target subset.

According to a fourth aspect of embodiments of the disclosure, there is provided a communication feedback apparatus. The apparatus may be applicable to a multicast receiver. The apparatus may include a receiving module and a feedback module.

The receiving module is configured to receive a first control signaling transmitted by a multicast transmitter when a second feedback mode is employed by default to give feedback.

The feedback module is configured to employ a first feedback mode or the second feedback mode to give feedback based on the first control signaling.

The first control signaling may be for instructing a target multicast receiver in a target subset to employ the first feedback mode to give feedback. The first feedback mode may be for feeding an acknowledgement character ACK back when communication data transmitted by the multicast transmitter is received correctly and for feeding a negative acknowledgement character NACK back when communication data transmitted by the multicast transmitter is not received correctly.

The first control signaling may be further for instructing other multicast receivers outside the target subset to employ the second feedback mode to give feedback. The second feedback mode may be for not feeding back when communication data transmitted by the multicast transmitter is received correctly and for feeding the NACK back when communication data transmitted by the multicast transmitter is not received correctly.

In a possible implementation, the feedback module is configured to employ the first feedback mode to give feedback when the first control signaling is a unicast signaling transmitted by the multicast transmitter.

In another possible implementation, the feedback module includes a first feedback unit and a second feedback unit.

The first feedback unit is configured to employ the first feedback mode to give feedback when the first control signaling is a multicast signaling transmitted by the multicast transmitter and the first control signaling carries a device identifier of the multicast receiver.

The second feedback unit is configured to employ the second feedback mode to give feedback when the first control signaling is the multicast signaling transmitted by the multicast transmitter and the first control signaling does not carry the device identifier of the multicast receiver.

In another possible implementation, the first control signaling may carry resource indication information. The resource indication information may be for indicating a first resource for the target multicast receiver to transmit feedback information. The feedback module includes a first transmitting unit and a second transmitting unit.

The first transmitting unit is configured to transmit the ACK through the first resource when communication data transmitted by the multicast transmitter is correctly received.

The second transmitting unit is configured to transmit the NACK through the first resource when communication data transmitted by the multicast transmitter is not correctly received.

In another possible implementation, the resource indication information may include an offset between the first resource for the target multicast receiver to transmit feedback information and a designated resource, the designated resource being a second resource for the multicast transmitter to transmit communication data, or may include a third resource for other multicast receiver to transmit feedback information. The apparatus includes a determining module.

The determining module is configured to determine the first resource based on the designated resource and the offset.

In another possible implementation, first resources for different target multicast receivers to transmit feedback information are orthogonal.

In another possible implementation, the first resource for the target multicast receiver to transmit feedback information is orthogonal to the third resource for the other multicast receiver to transmit feedback information.

In another possible implementation, third resources for other multicast receivers to transmit feedback information are the same.

In another possible implementation, the apparatus includes a measuring module, a third transmitting module, or a fourth transmitting module.

The measuring module is configured to measure a channel quality between the multicast receiver and the multicast transmitter.

The third transmitting module is configured to transmit a channel quality report signaling to the multicast transmitter. The channel quality report signaling may carry the channel quality.

The fourth transmitting module is configured to transmit a channel quality report signaling to the multicast transmitter when the channel quality is lower than a second preset channel quality. The channel quality report signaling may carry the channel quality.

In another possible implementation, the apparatus further includes a receiving module.

The receiving module is configured to receive a third control signaling transmitted by a base station. The third control signaling may carry the second preset channel quality.

The receiving module is further configured to receive a fourth control signaling transmitted by the multicast transmitter. The fourth control signaling may carry the second preset channel quality.

According to a fifth aspect of embodiments of the disclosure, there is provided a multicast transmitter.

The multicast transmitter includes a processor.

The multicast transmitter further includes a memory for storing signalings executable by the processor.

The processor is configured to perform the following.

A target subset is determined from a set of multicast receiving devices. The set of multicast receiving devices may include a plurality of multicast receivers that receive multicast communication. The target subset may include at least one target multicast receiver in the plurality of multicast receivers.

A first control signaling is transmitted. The first control signaling may be for instructing the target multicast receiver in the target subset to employ a first feedback mode to give feedback. The first feedback mode may be for feeding an acknowledgement character ACK back when communication data transmitted by the multicast transmitter is received correctly and for feeding a negative acknowledgement character NACK back when communication data transmitted by the multicast transmitter is not received correctly.

The first control signaling may be further for instructing other multicast receivers outside the target subset to employ a second feedback mode to give feedback. The second feedback mode may be for not feeding back when communication data transmitted by the multicast transmitter is received correctly and for feeding the NACK back when communication data transmitted by the multicast transmitter is not received correctly.

According to a sixth aspect of embodiments of the disclosure, it is provided a multicast receiver.

The multicast receiver includes a processor.

The multicast receiver further includes a memory for storing signalings executable by the processor.

The processor is configured to perform the following.

A first control signaling transmitted by a multicast transmitter is received when a second feedback mode is employed by default to give feedback.

A first feedback mode or the second feedback mode is employed to give feedback based on the first control signaling.

The first control signaling may be for instructing a target multicast receiver in a target subset to employ the first feedback mode to give feedback. The first feedback mode may be for feeding an acknowledgement character ACK back when communication data transmitted by the multicast transmitter is received correctly and for feeding a negative acknowledgement character NACK back when communication data transmitted by the multicast transmitter is not received correctly.

The first control signaling may be further for instructing other multicast receivers outside the target subset to employ the second feedback mode to give feedback. The second feedback mode may be for not feeding back when communication data transmitted by the multicast transmitter is received correctly and for feeding the NACK back when communication data transmitted by the multicast transmitter is not received correctly.

According to a seventh aspect of embodiments of the disclosure, there is provided a computer-readable storage medium, on which at least one signaling is stored. The signaling when being executed by a processor, implements actions of the communication feedback method according to the first aspect of the disclosure.

According to an eighth aspect of embodiments of the disclosure, there is provided a computer-readable storage medium, on which at least one signaling is stored. The signaling when being executed by a processor, implements actions of the communication feedback method according to the second aspect of the disclosure.

With the method, the apparatus, the device, and the storage medium provided in embodiments of the disclosure, the target subset is determined from the set of multicast receiving devices. The target subset includes the at least one target multicast receiver in the plurality of multicast receivers. The first control signaling is transmitted. Therefore, the target multicast receiver in the target subset may be instructed to employ the first feedback mode to give feedback, and other multicast receivers may be instructed to employ the second feedback mode to give feedback. Compared with all multicast receivers employing the first feedback mode, the problem of communication data loss due to incorrect reception of the SCI may be effectively avoided, and the transmission reliability may be improved. Compared with all multicast receivers employing the second feedback mode, the signaling overhead may be reduced and feedback resources may be saved.

In addition, when the channel quality measured by the multicast receiver is lower than the second preset channel quality, the channel quality is reported to the multicast transmitter, which enables the multicast transmitter to acquire the channel quality of the receiver with the lower channel quality, and also may reduce the signaling overhead.

In addition, considering that the channel quality of the uplink channel may represent the channel quality of the downlink channel, the channel quality between each multicast receiver and the multicast transmitter may be acquired by measuring the channel quality at the multicast transmitter. The accurate channel quality may be acquired, and the receiver does not need to report the channel quality, which may reduce the signaling overhead.

In addition, the transmitter determines whether to retransmit based on the information fed back by the target multicast receiver and the information fed back by other multicast receivers. By distinguishing the feedback information from the target multicast receiver and the feedback information from other multicast receivers, various situations in the communication process may be determined. It may be determined whether to perform retransmission based on different situations, which may not only improve the transmission reliability, but also reduce the signaling overhead as much as possible and save communication resources.

In addition, the first resources for different target multicast receivers to transmit feedback information are orthogonal; and/or, the first resource for the target multicast receiver to transmit feedback information is orthogonal to the third resource for the other multicast receiver to transmit feedback information. Therefore, mutual interference between feedback information may be avoided and the accuracy may be improved.

In addition, the resources for other multicast receivers to transmit feedback information are the same, and the resources are shared by other multicast receivers, which may achieve the accurate feedback and save feedback resources.

BRIEF DESCRIPTION OF THE DRAWINGS

The drawings herein are incorporated into the specification and constitute a part of the specification, illustrate embodiments in accordance with the disclosure, and together with the specification are used to explain the principle of the disclosure.

DETAILED DESCRIPTION

In order to make the objectives, technical solutions, and advantages of the disclosure clearer, the following further describes the disclosure in detail with reference to the embodiments and the drawings. Here, exemplary embodiments of the disclosure and the description thereof are used to explain the disclosure, but are not intended to limit the disclosure.

Embodiments of the disclosure provide a communication feedback method and apparatus, a device and a storage medium. The disclosure will be described in detail below with reference to the drawings.

Figure 1:
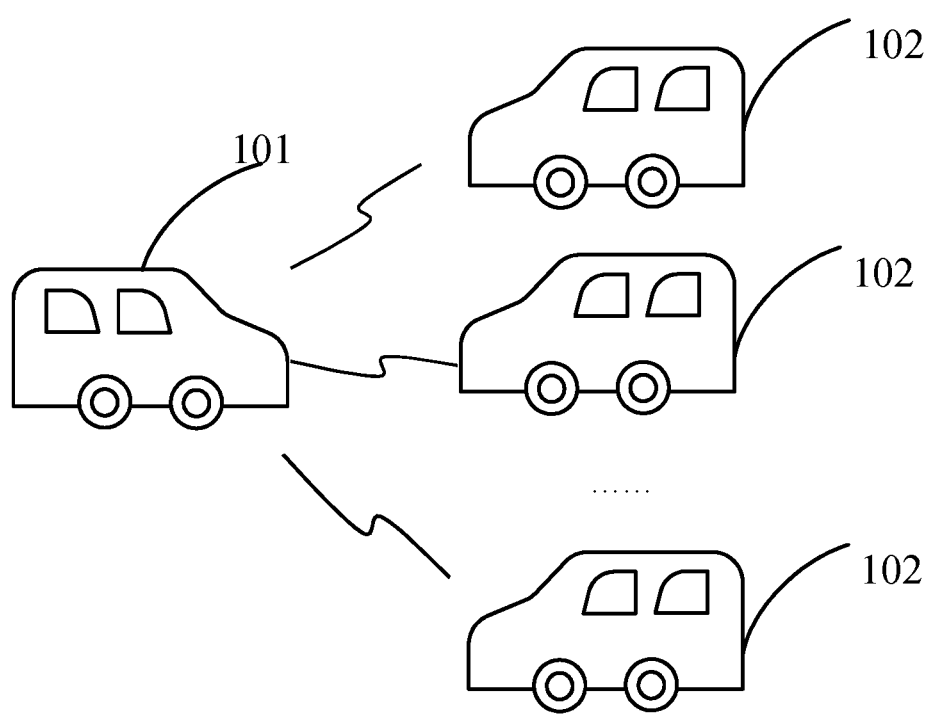
FIG. 1 is a schematic diagram of a communication system according to an exemplary embodiment of the disclosure.

FIG. 1 is a schematic diagram of a communication system according to an exemplary embodiment of the disclosure. Referring to FIG. 1, the communication system includes a multicast transmitter 101 and a plurality of multicast receivers 102.

The multicast transmitter 101 and the multicast receiver 102 may be any type of equipment. For example, the multicast transmitter 101 may be a vehicle-mounted device, a handheld device, or a roadside device. The multicast receiver 102 may be a vehicle-mounted device, a handheld device, or a roadside device. The multicast transmitter 101 and the multicast receiver 102 may communicate through a direct link. The communication mode of the direct link has characteristics of the short delay and the low signaling overhead, and also supports the multicast transmission mode and the HARQ mechanism of the multicast transmission mode. In the process of multicast communication between the multicast transmitter 101 and the plurality of multicast receivers 102, the plurality of multicast receivers 102 may feed back based on the HARQ mechanism back.

In some embodiments of the disclosure, two feedback modes are set as follows.

A first feedback mode may be: to feed an ACK (an acknowledgement character) back when communication data transmitted by the multicast transmitter 101 is correctly received, and feed a NACK (a negative acknowledgement character) back when communication data transmitted by the multi cast transmitter 101 is not correctly received.

A second feedback mode may be: to not feed back when communication data transmitted by the multicast transmitter 101 is correctly received, and feed the NACK back when communication data transmitted by the multicast transmitter 101 is not correctly received.

In order to improve the transmission reliability while reducing the signaling overhead, the multicast transmitter 101 determines the target subset from the set of multicast receiving devices. The target subset includes at least one target multicast receiver. Therefore, the target multicast receiver employs the first feedback mode to give feedback, and other multicast receivers 102 except the target multicast receiver employ the second feedback mode to give feedback, which may not only reduce the signaling overhead and save feedback resources, but also effectively avoid the problem of communication data loss due to incorrect reception of the SCI and improve the transmission reliability.

Figure 2:
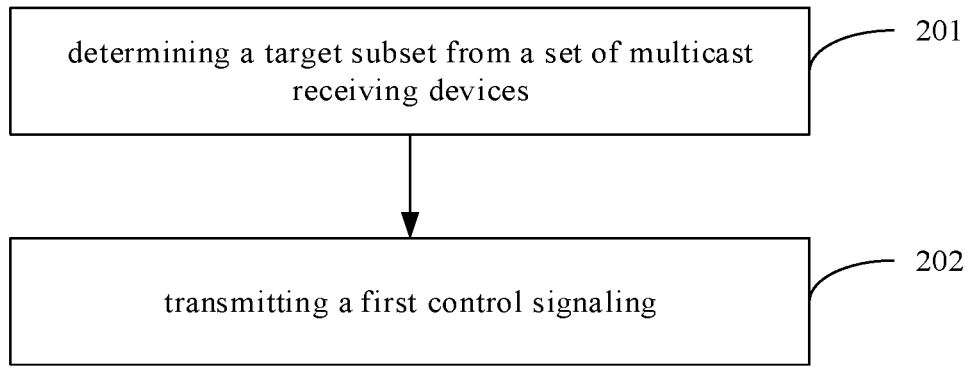
FIG. 2 is a flow chart of a communication feedback method according to an exemplary embodiment of the disclosure.

FIG. 2 is a flow chart of a communication feedback method according to an exemplary embodiment of the disclosure, which may be applicable to the transmitter. Referring to FIG. 2, the method may include the following.

At block 201, a target subset is determined from a set of multicast receiving devices.

The set of multicast receiving devices may include a plurality of multicast receivers that receive multicast communication. The target subset may include at least one target multicast receiver in the plurality of multi cast receivers.

At block 202, a first control signaling is transmitted.

The first control signaling may be for instructing the target multicast receiver in the target subset to employ the first feedback mode to give feedback. The first feedback mode may be for feeding an ACK (acknowledgement character) back when communication data transmitted by the multi cast transmitter is received correctly and for feeding a NACK (negative acknowledgement character) back when communication data transmitted by the multicast transmitter is not received correctly.

The first control signaling may be further for instructing other multicast receivers outside the target subset to employ a second feedback mode to give feedback. The second feedback mode may be for not feeding back when communication data transmitted by the multicast transmitter is received correctly and for feeding the NACK back when communication data transmitted by the multicast transmitter is not received correctly.

With the method provided in embodiments of the disclosure, the target subset is determined from the set of multicast receiving devices. The target subset includes the at least one target multicast receiver in the plurality of multicast receivers. The first control signaling is transmitted. Therefore, the target multicast receiver in the target subset may be instructed to employ the first feedback mode to give feedback, and other multicast receivers may be instructed to employ the second feedback mode to give feedback. Compared with all multicast receivers employing the first feedback mode, the problem of communication data loss due to incorrect reception of the SCI may be effectively avoided, and the transmission reliability may be improved. Compared with all multicast receivers employing the second feedback mode, the signaling overhead may be reduced and feedback resources may be saved.

In a possible implementation, the transmitting the first control signaling may include the following.

The first control signaling is transmitted to each target multicast receiver in the target subset. The first control signaling may be for instructing to employ the first feedback mode.

Or the first control signaling is multicasted to the plurality of multicast receivers. The first control signaling may carry a device identifier of the target multicast receiver in the target subset.

In another possible implementation, the first control signaling may carry resource indication information. The resource indication information may be for indicating a first resource for the at least one target multicast receiver to transmit feedback information.

In another possible implementation, the resource indication information may include the first resource for the at least one target multicast receiver to transmit feedback information.

Or the resource indication information may include an offset between the first resource and a designated resource, the designated resource being a second resource for the multicast transmitter to transmit communication data, or may include a third resource for other multicast receiver to transmit feedback information.

In another possible implementation, first resources for different target multicast receivers to transmit feedback information are orthogonal.

In another possible implementation, the first resource for the target multicast receiver to transmit feedback information is orthogonal to the third resource for the other multicast receiver to transmit feedback information.

In another possible implementation, third resources for other multicast receivers to transmit feedback information are the same.

In another possible implementation, the determining the target subset from the set of multicast receiving devices may include the following.

The at least one target multicast receiver whose channel quality with the multicast transmitter is lower than that of other multicast receivers or a preset channel quality and whose number does not exceed a preset number is selected from the set of multicast receiving devices, to add to the target subset.

In another possible implementation, the selecting the at least one target multicast receiver whose channel quality with the multicast transmitter is lower than that of other multicast receivers or the preset channel quality and whose number does not exceed the preset number to add to the target subset, may include the following.

A channel quality report signaling transmitted by at least one multicast receiver of the plurality of multicast receivers is received. The channel quality report signaling may carry a channel quality between the corresponding multicast receiver and the multicast transmitter.

Or a channel quality between each of the plurality of multicast receivers and the multicast transmitter is measured.

The at least one target multicast receiver whose channel quality with the multicast transmitter is lower than that of other multicast receivers or a first preset channel quality and whose number does not exceed the preset number is selected based on the acquired channel quality to add to the target subset.

In another possible implementation, the method further includes the following.

The preset number or the first preset channel quality predefined in a preset protocol is acquired.

Or, a second control signaling transmitted by a base station is received. The second control signaling may carry the preset number, or the second control signaling may carry the first preset channel quality.

In another possible implementation, any one of the plurality of multicast receivers is configured to transmit a channel quality report signaling to the multicast transmitter when a channel quality with the multicast transmitter is lower than a second preset channel quality. The channel quality report signaling may carry the channel quality.

The selecting the at least one target multicast receiver whose channel quality with the multicast transmitter is lower than that of other multicast receivers or the preset channel quality and whose number does not exceed the preset number to add to the target subset, includes the following.

A channel quality report signaling transmitted by at least one multicast receiver of the plurality of multicast receivers is received.

A multicast receiver that does not exceed the preset number in the at least one multicast receiver is added to the target subset.

Figure 3:
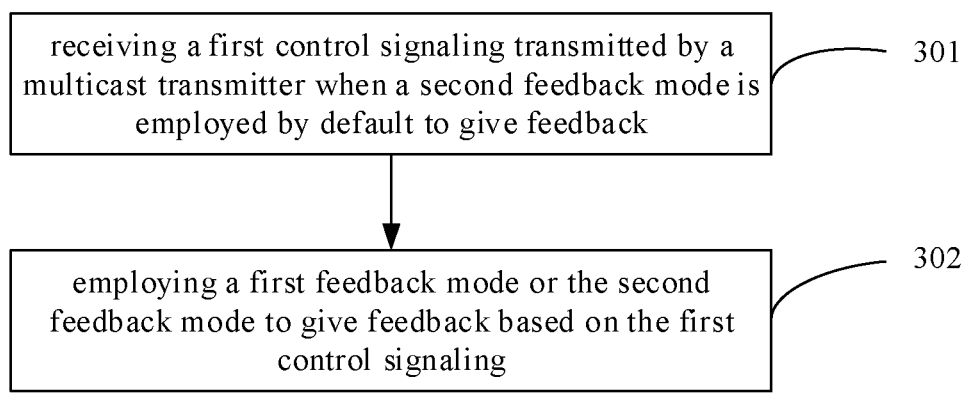
FIG. 3 is a flow chart of a communication feedback method according to an exemplary embodiment of the disclosure.

FIG. 3 is a flow chart of a communication feedback method according to an exemplary embodiment of the disclosure, which may be applicable to the receiver. Referring to FIG. 3, the method may include the following.

At block 301, a first control signaling transmitted by a multicast transmitter is received when a second feedback mode is employed by default to give feedback.

At block 302, a first feedback mode or the second feedback mode is employed to give feedback based on the first control signaling.

The first control signaling may be for instructing a target multicast receiver in a target subset to employ the first feedback mode to give feedback. The first feedback mode may be for feeding an acknowledgement character ACK back when communication data transmitted by the multicast transmitter is received correctly and for feeding a negative acknowledgement character NACK back when communication data transmitted by the multicast transmitter is not received correctly.

The first control signaling may be further for instructing other multicast receivers outside the target subset to employ the second feedback mode to give feedback. The second feedback mode may be for not feeding back when communication data transmitted by the multicast transmitter is received correctly and for feeding the NACK back when communication data transmitted by the multicast transmitter is not received correctly.

With the method provided in the embodiments of the disclosure, the first control signaling transmitted by the multicast transmitter is received, and the first feedback mode or the second feedback mode is employed to give feedback based on the first control signaling. Therefore, the target multicast receiver in the target subset may be instructed to employ the first feedback mode to give feedback, and other multicast receivers may be instructed to employ the second feedback mode to give feedback. Compared with all multicast receivers employing the first feedback mode, the problem of communication data loss due to incorrect reception of the SCI may be effectively avoided, and the transmission reliability may be improved. Compared with all multicast receivers employing the second feedback mode, the signaling overhead may be reduced and feedback resources may be saved.

In a possible implementation, the employing the first feedback mode or the second feedback mode to give feedback based on the first control signaling includes the following.

The first feedback mode is employed to give feedback when the first control signaling is a unicast signaling transmitted by the multicast transmitter.

The employing the first feedback mode or the second feedback mode to give feedback based on the first control signaling includes the following.

The first feedback mode is employed to give feedback when the first control signaling is a multicast signaling transmitted by the multicast transmitter and the first control signaling carries a device identifier of the multicast receiver.

The second feedback mode is employed to give feedback when the first control signaling is the multicast signaling transmitted by the multicast transmitter and the first control signaling does not carry the device identifier of the multicast receiver.

In another possible implementation, the first control signaling may carry resource indication information. The resource indication information may be for indicating a first resource for the target multicast receiver to transmit feedback information. The employing the first feedback mode to give feedback includes the following.

The ACK is transmitted through the first resource when communication data transmitted by the multicast transmitter is correctly received.

The NACK is transmitted through the first resource when communication data transmitted by the multicast transmitter is not correctly received.

In another possible implementation, the resource indication information may include an offset between the first resource for the target multicast receiver to transmit feedback information and a designated resource, the designated resource being a second resource for the multicast transmitter to transmit communication data, or may include a third resource for other multicast receiver to transmit feedback information. The method further includes the following.

In another possible implementation, the first resource is determined based on the designated resource and the offset.

First resources for different target multicast receivers to transmit feedback information are orthogonal.

In another possible implementation, the first resource for the target multicast receiver to transmit feedback information is orthogonal to the third resource for the other multicast receiver to transmit feedback information.

In another possible implementation, third resources for other multicast receivers to transmit feedback information are the same.

In another possible implementation, the method further includes the following.

A channel quality between the multicast receiver and the multicast transmitter is measured.

A channel quality report signaling is transmitted to the multicast transmitter. The channel quality report signaling may carry the channel quality.

Or a channel quality report signaling is transmitted to multi cast transmitter when the channel quality is lower than a second preset channel quality. The channel quality report signaling may carry the channel quality.

In another possible implementation, the method further includes the following.

A third control signaling transmitted by a base station is received. The third control signaling may carry the second preset channel quality.

Or a fourth control signaling transmitted by the multicast transmitter is received. The fourth control signaling may carry the second preset channel quality.

Figure 4:
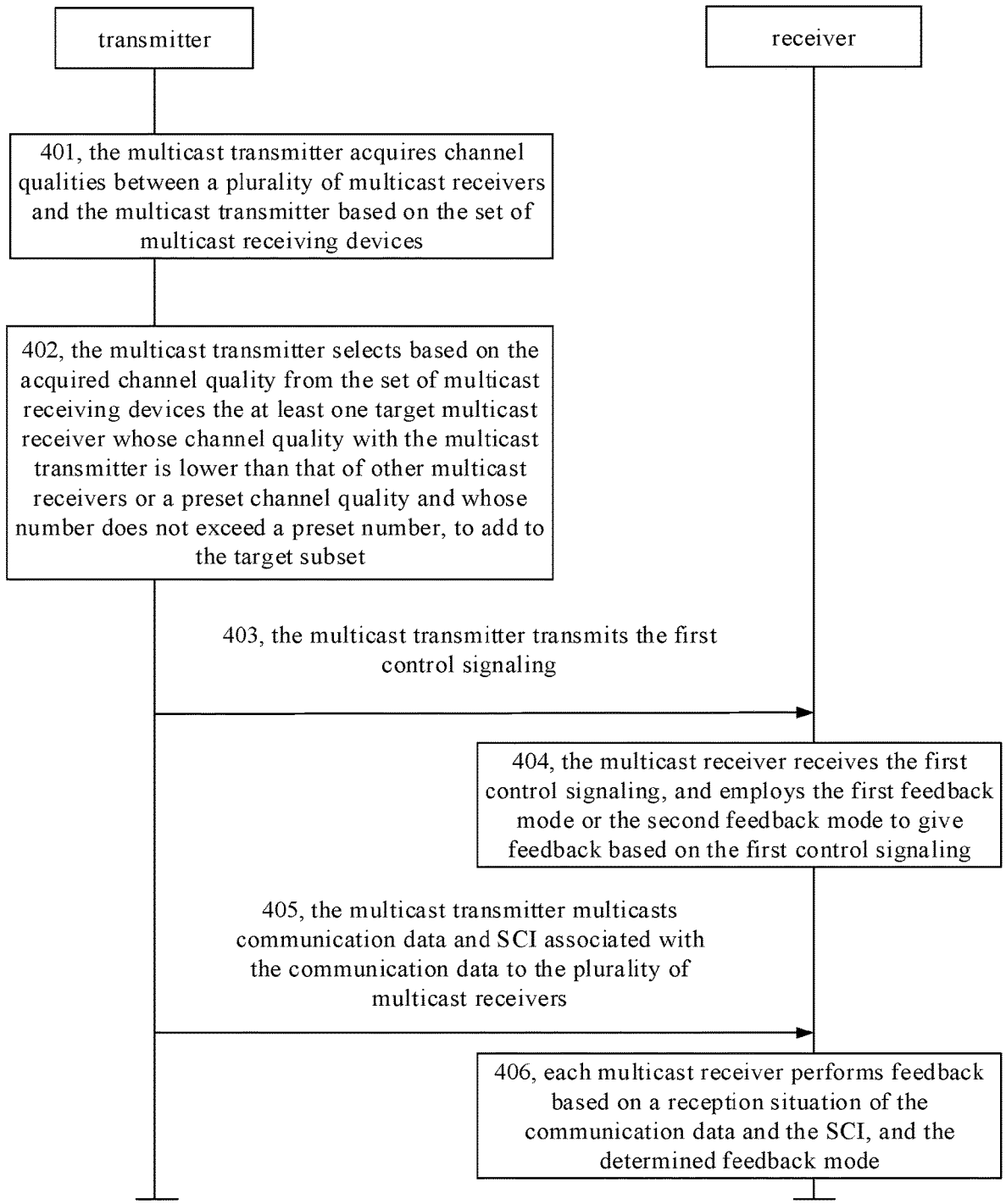
FIG. 4 is a flow chart of a communication feedback method according to an exemplary embodiment of the disclosure.

FIG. 4 is a flow chart of a communication feedback method according to an exemplary embodiment of the disclosure, which may be applicable to a multicast transmitter and a multicast receiver. Referring to FIG. 4, the method includes the following.

At block 401, the multicast transmitter acquires channel qualities between a plurality of multicast receivers and the multicast transmitter based on the set of multicast receiving devices.

The set of multicast receiving devices includes a plurality of multicast receivers that perform multicast communication with the multicast transmitter.

In some embodiments of the disclosure, two feedback modes are set as follows.

A first feedback mode may be: to feed an ACK back when communication data transmitted by the multi cast transmitter is correctly received, and feed a NACK back when communication data transmitted by the multicast transmitter is not correctly received.

A second feedback mode may be: to not feed back when communication data transmitted by the multicast transmitter is correctly received, and feed the NACK back when communication data transmitted by the multicast transmitter is not correctly received.

When the multicast transmitter and the plurality of multicast receivers perform multicast communication, if the plurality of multicast receivers all employ the first feedback mode to give feedback, each multicast receiver may feed the ACK back to the multicast transmitter when the communication data are correctly received and feed the NACK back to the multicast transmitter when the communication data are not correctly received, which may cause a large signaling overhead. It is also necessary to allocate different resources for each multicast receiver to transmit feedback information, which may waste too much feedback resources.

If the plurality of multicast receivers all employ the second feedback mode to give feedback, any multicast receiver may not feed any information back to the multicast transmitter when this multicast receiver does not receive the SCI correctly, and the multicast transmitter may mistakenly determine that the transmission of the communication data are successful, and may not retransmit the communication data, which may result in the loss of communication data and thus the low transmission reliability.

Furthermore, considering differences in factors such as distances, relative speeds, and external environment between the multicast receivers and the multicast transmitter, the channel qualities between the multicast transmitter and different multicast receivers may also different. When the plurality of multicast receivers for multicast communication receive the same communication data, the communication quality depends on the channel quality between one or more multicast receivers with the lower channel quality and the multicast transmitter.

Therefore, in some embodiments of the disclosure, the plurality of multicast receivers may be distinguishingly configured to the feedback modes. The multicast receiver with the lower channel quality employs the first feedback mode, and the multicast receiver with the higher channel quality employs the second feedback mode. It may not only reduce the signaling overhead and save feedback resources, but also effectively avoid the problem of communication data loss due to incorrect reception of the SCI and improve the transmission reliability.

The multicast transmitter first acquires the channel qualities between the plurality of multicast receivers and the multicast transmitter based on the set of multicast receiving devices. In a possible implementation, the action at block 401 includes any one of the following actions at 4011-4013.

At 4011, each multicast receiver measures the channel quality between the multicast receiver and the multicast transmitter and transmits a channel quality report signaling to the multicast transmitter. The channel quality report signaling carries the measured channel quality. The multicast transmitter receives the channel quality report signalings transmitted by the plurality of multicast receivers, thereby acquiring the channel quality of each multicast receiver.

The channel quality may be determined by a measurement result of the multicast receiver measuring a signal transmitted by the multicast transmitter. The channel quality may be presented by any item in the measurement result, such as RSRP (Reference Signal Receiving Power), RSRQ (Reference Signal Receiving Quality), RSSI (Received Signal Strength Indication), SINR (Signal to Interference plus Noise Ratio), and data packet reception error rate.

For each multicast receiver, the multicast receiver may perform measurement to acquire the channel quality from the multicast transmitter to the multicast receiver when the multicast transmitter transmits control signalings, communication data, or other data to the multicast receiver. The measured channel quality may be reported to the multicast transmitter by transmitting the channel quality report signaling to the multicast transmitter.

In addition, the channel quality report signaling may also carry a device identifier of the multicast receiver so that the multicast transmitter may determine the device identifier of the multicast receiver, distinguish different multicast receivers based on the device identifiers, and also transmit the control signaling to the multicast receiver based on the device identifier to configure the feedback mode for each multicast receiver.

The device identifier is configured to determine a corresponding unique device in the multicast communication, which may be a source address, a physical layer address, or a MAC (Media Access Control) layer address of the device.

It should be noted that the operation of the multicast receiver transmitting the channel quality report signaling may be automatically triggered by the multicast receiver based on a protocol with the multicast transmitter, or triggered by a control signaling transmitted by the multicast transmitter or the base station. That is, the multicast transmitter or the base station transmits a reporting signaling to the multicast receiver, and the multicast receiver measures the channel quality and reports it when the multicast receiver receives the reporting signaling.

At 4012, each multicast receiver measures the channel quality between the multicast receiver and the multicast transmitter. When the channel quality is lower than the second preset channel quality, the multicast receiver transmits a channel quality report signaling to the multicast transmitter. The channel quality report signaling carries the measured channel quality. When the channel quality is not lower than the second preset channel quality, the multicast receiver may not transmit the channel quality report signaling to the multicast transmitter. The multicast transmitter receives the channel quality report signaling transmitted by at least one multicast receiver in the plurality of multicast receivers, so as to acquire the channel quality of the at least one multicast receiver.

Since the multicast transmitter needs to determine the multicast receiver with the lower channel quality only, there is no need to determine the channel qualities of all multicast receivers. Therefore, in order to reduce the signaling overhead, the multicast receiver may first determine whether the channel quality is lower than the second preset channel quality after measuring the channel quality. When the channel quality is lower than the second preset channel quality, the channel quality is reported to the multicast transmitter through transmitting the channel quality report signaling to the multicast transmitter. When the channel quality is not lower than the second preset channel quality, the channel quality may not be reported to the multicast transmitter.

In addition, the channel quality report signaling may also carry a device identifier of the multicast receiver so that the multicast transmitter may determine the device identifier of the multicast receiver, distinguish different multicast receivers based on the device identifiers, and also transmit the control signaling to the multicast receiver based on the device identifier to configure the feedback mode for each multicast receiver.

The second preset channel quality may be a preset RSRP threshold, a preset RSRQ threshold, a preset RSSI threshold, a preset SINR threshold, a data packet reception error rate threshold, etc. The second preset channel quality may be pre-defined based on the protocol between the multicast transmitter and the multicast receiver, or may be configured by the multicast receiver, or may be configured by the multicast transmitter or the base station.

It should be noted that the operation of the multicast receiver transmitting the channel quality report signaling may be automatically triggered by the multicast receiver based on a protocol with the multicast transmitter, or triggered by a control signaling transmitted by the multicast transmitter or the base station. That is, the multicast transmitter or the base station transmits a reporting signaling to the multicast receiver, and the multicast receiver measures the channel quality and reports it when the multicast receiver receives the reporting signaling. The second preset channel quality may be carried in the reporting signaling and transmitted to the multicast receiver.

For example, the multicast receiver receives a third control signaling transmitted by the base station, and the third control signaling carries the second preset channel quality; or, the multicast receiver receives a fourth control signaling transmitted by the multicast transmitter, and the fourth control signaling carries the second preset channel quality.

In a possible implementation, for the plurality of foregoing channel qualities, corresponding second preset channel qualities may be set respectively. When the multicast receiver measures to acquire the plurality of channel qualities, it determines whether at least one of the channel qualities is lower than the corresponding second preset channel quality. When at least one channel quality is lower than the corresponding second preset channel quality, the channel quality report signaling may be transmitted to the multicast transmitter, and the plurality of measured channel qualities may be reported to the multicast transmitter. When the at least one channel quality is not lower than the second preset channel quality, the plurality of measured channel qualities may not be reported to the multicast transmitter.

The at least one of the channel qualities may be pre-defined based on the protocol between the multicast transmitter and the multicast receiver, or may be configured by the multicast receiver, or may be configured by the multicast transmitter or the base station.

At 4013, the multicast transmitter measures channel qualities between the plurality of multicast receivers and the multicast transmitter respectively.

The channel quality may also be determined by a measurement result of a channel between the multicast transmitter and the multicast receiver. The multicast transmitter may perform measurement to acquire the channel quality of the channel from the multicast receiver to the multicast transmitter when the multicast receiver transmits signalings, communication data, or other data to the multicast transmitter through the channel, and determine the channel quality from the multicast transmitter to the multicast receiver based on the channel reciprocity. By measuring the channel quality at the multicast transmitter, there is no need for the multicast receiver to report the channel quality, which reduces the signaling overhead.

The channel reciprocity may refer to that when the time resource interval is short, it may be considered that transmitted signals experience the same channel fading, that is, the channel quality is the same when the transmission is performed on the same frequency resource and different time resources.

At block 402, the multicast transmitter selects based on the acquired channel quality from the set of multicast receiving devices the at least one target multicast receiver whose channel quality with the multicast transmitter is lower than that of other multicast receivers or a preset channel quality and whose number does not exceed a preset number, to add to the target subset.

In some embodiments of the disclosure, the multicast transmitter may select at least one multicast receiver with the lower channel quality and whose number does not exceed the preset number based on the channel quality of each multicast receiver, as the target multicast receiver to add to the target subset. Therefore, the channel quality of the target multicast receiver in the target subset is lower than the channel qualities of other multicast receivers outside the target subset. Or, at least one multicast receiver whose channel quality is lower than the preset channel quality and whose number does not exceed the preset number is selected as the target multicast receiver and added to the target subset, so that the channel quality of the target multicast receiver in the target subset is lower than the preset channel quality.

In a possible implementation, when the multicast transmitter adopts the above action at 4011 or 4013 to acquire the channel quality, the action at block 402 may include any one of the following actions at 4021-4023.

At 4021, a preset number of target multicast receivers are selected based on an order of channel qualities between the plurality of multicast receivers and the multicast transmitter, so that the channel qualities of the preset number of target multicast receivers and the multicast transmitter are lower than that of other multicast receivers, and the preset number of target multicast receivers are added to the target subset.

The preset number may be predefined based on the protocol of the multicast transmitter, or configured by the multicast transmitter or the base station. For example, the multicast transmitter acquires the preset number predefined in the preset protocol, or the multicast transmitter receives the second control signaling transmitted by the base station, and the second control signaling carries the preset number.

In addition, when sorting the channel qualities between the plurality of multicast receivers and the multicast transmitter, it may sort based on a predetermined method, such as sorting based on the channel qualities from high to low, or from low to low, or in other ways.

After sorting, the target multicast receivers may be selected based on the determined order, so that the channel quality between the selected target multicast receiver and the multicast transmitter is lower than the channel quality of other unselected multicast receiver and the multicast transmitter.

At 4022, the target multicast receiver with the channel quality lower than the first preset channel quality is selected and added to the target subset based on the channel qualities between the plurality of multicast receivers and the multicast transmitter.

The first preset channel quality may be a preset RSRP threshold, a preset RSRQ threshold, a preset RSSI threshold, a preset SINR threshold, a data packet reception error rate threshold, etc. The first preset channel quality may be predefined based on the protocol of the multicast transmitter, or configured by the multicast transmitter or the base station.

For example, the multicast transmitter acquires the first preset channel quality predefined in the preset protocol; or the multicast transmitter receives the second control signaling transmitted by the base station and the second control signaling carries the first preset channel quality.

At 4023, a preset number of multicast receivers are selected based on an order of channel qualities between the plurality of multicast receivers and the multicast transmitter, and the target multicast receiver with the channel quality lower than the first preset channel quality is selected from the preset number of multicast receivers and added to the target subset.

In another possible implementation, when the multicast transmitter adopts the above action at 4012 to acquire the channel quality, the action at block 402 may include any one of the following actions at 4024-4027.

At 4024, the multicast transmitter receives the channel quality report signaling transmitted by at least one multicast receiver in the plurality of multicast receivers, and the at least one multicast receiver is added to the target subset.

Since the channel quality reported by the at least one multicast receiver is lower than the second preset channel quality, the multicast transmitter may not judge the channel quality measured by the at least one multicast receiver.

At 4025, the multicast transmitter receives the channel quality report signaling transmitted by at least one multicast receiver in the plurality of multicast receivers, and selects target multicast receivers that do not exceed the preset number from the at least one multicast receiver, and the selected target multicast receivers are added to the target subset.

The multicast transmitter regards the preset number as the maximum number of target multicast receivers. When the number of the at least one multicast receiver does not exceed the preset number, the at least one multicast receiver is regarded as the target multicast receiver and added to the target subset. When the number of the at least one multicast receiver exceeds the preset number, the target multicast receivers that do not exceed the preset number may be selected from the at least one multicast receiver, and added to the target subset.

At 4026, the multicast transmitter receives the channel quality report signaling transmitted by at least one multicast receiver in the plurality of multicast receivers, and selects the target multicast receiver whose channel quality is lower than the first preset channel quality from the at least one multicast receiver and the selected target multicast receiver is added to the target subset.

The first preset channel quality is lower than the second preset channel quality. The channel quality reported by the at least one multicast receiver is lower than the second preset channel quality. When the multicast transmitter acquires the channel quality of the at least one multicast receiver, it may determine whether the channel quality of the at least one multicast receiver is lower than the first preset channel quality, so that the multicast receiver whose channel quality is lower than the first preset channel quality is used as the target multicast receiver. The target multicast receiver is added to the target sub-collection.

At 4027, the multicast transmitter receives the channel quality report signaling transmitted by at least one multicast receiver in the plurality of multicast receivers, and selects the target multicast receivers whose channel quality is lower than the first preset channel quality and whose number does not exceed the preset number from the at least one multicast receiver, and the selected target multicast receivers are added to the target subset.

At block 403, the multicast transmitter transmits the first control signaling.

At block 404, the multicast receiver receives the first control signaling, and employs the first feedback mode or the second feedback mode to give feedback based on the first control signaling.

The first control signaling may be for instructing the target multicast receiver in the target subset to employ the first feedback mode to give feedback, and also instructing other multicast receivers outside the target subset to employ the second feedback mode to give feedback.

Each multicast receiver employs the second feedback mode by default. The multicast transmitter transmits the first control signaling to notify the target multicast receiver to employ the first feedback mode to give feedback, while other multicast receivers still employ the second feedback mode to give feedback.

In a possible implementation, the actions at blocks 403 and 404 may include the following actions at 4031-4032.

At 4031, the multicast transmitter separately transmits the first control signaling to each target multicast receiver in the target subset, in which the first control signaling is for indicating that the first feedback mode is employed. At this time, the first control signaling is a unicast signaling transmitted by the multicast transmitter, and the target multicast receiver that has received the first control signaling employs the first feedback mode to give feedback.

The multicast transmitter may not transmit the first control signaling to other multicast receivers, and the other multicast receivers still employ the default second feedback mode to give feedback.

At 4032, the multicast transmitter multicasts the first control signaling to the plurality of multicast receivers. The first control signaling carries the device identifier of the target multicast receiver in the target subset. That is, the first control signaling is a multicast signaling transmitted by the multicast transmitter, and each multicast receiver may receive the first control signaling.

For each multicast receiver, the multicast receiver receives the first control signaling, determines that the first control signaling is the multicast signaling transmitted by the multicast transmitter, acquires the device identifier carried in the first control signaling, and determines whether the first control signaling carries the device identifier of this multicast receiver. When the first control signaling carries the device identifier of the multicast receiver, it indicates that this multicast receiver is the target multicast receiver, and the first feedback mode is employed to give feedback. When the first control signaling does not carry the device identifier of the multicast receiver, it indicates that this multicast receiver is not the target multicast receiver, and the second feedback mode is employed to give feedback.

It should be noted that, in some embodiments of the disclosure, the control signaling transmitted by the multicast transmitter to the multicast receiver, may include the first control signaling, the second control signaling, etc., which may be the direct link control signaling, such as a physical layer signaling, a MAC CE (Media Access Control Control Element) signaling, or a RRC (Radio Resource Control) signaling.

At block 405, the multicast transmitter multicasts communication data and SCI associated with the communication data to the plurality of multicast receivers.

At block 406, each multicast receiver performs feedback based on a reception situation of the communication data and the SCI, and the determined feedback mode.

After the feedback modes of the plurality of multicast receivers are determined through the above actions at blocks 401-405, in the subsequent communication process, the multicast transmitter multicasts the communication data to the plurality of multicast receivers, and also multicasts the SCI associated with the communication data. The SCI carries the second resource for transmitting the communication data. Each multicast receiver may receive the SCI, determine the second resource for transmitting the communication data, and receive the communication data through the second resource.

In a possible implementation, the multicast transmitter transmits the communication data first and then transmits the SCI, or the multicast transmitter transmits the SCI first and then transmits the communication data, or the multicast transmitter transmits the communication data and the SCI in parallel.

After that, each multicast receiver may employ the determined feedback mode to give feedback based on the reception situation of the communication data and the SCI. This communication feedback may include the following.

At 4061, when the multicast receiver does not correctly receive the SCI, the multicast receiver may not feed any information back to the multicast transmitter.

At 4062, when the multicast receiver correctly receives the SCI, the multicast receiver may determine the second resource for transmitting the communication data, receive the communication data through the second resource, and perform feedback.

2-1, when the target multicast receiver correctly receives the communication data, the target multicast receiver feeds the ACK back to the multicast transmitter; when the target multicast receiver does not correctly receive the communication data, the target multicast receiver feeds the NACK back to the multicast transmitter.

2-2, when other multicast receivers correctly receive the communication data, other multicast receivers may not feed any information back; when other multicast receivers do not correctly receive the communication data, other multicast receivers may feed NACK back to the multicast transmitter.

The multicast transmitter may determine whether to retransmit based on the information fed back by the multicast receiver. The retransmission includes any of actions at 4063-4065.

At 4063, when the multicast transmitter receives the NACK transmitted by any multicast receiver, the multicast transmitter retransmits the communication data.

In a possible implementation, when the multicast transmitter receives the NACK transmitted by any one or more target multicast receivers and receives the ACK transmitted by other target multicast receivers, it may transmit the communication data to the target multicast receiver that transmits the NACK, and may not transmit the communication data to other multicast receivers or the target multicast receiver that transmits the ACK, so as to increase the transmission efficiency. When the multicast transmitter receives the NACK transmitted by any other multicast receiver except the target multicast receiver, it may transmit the communication data to the plurality of multicast receivers, such as multicasting the communication data.

At 4064, when the multicast transmitter does not receive the ACK and the NACK transmitted by the target multicast receiver, that is, the target multicast receiver does not feed back any information, it indicates that the target multicast receiver is likely to be caused not to receive the communication data by not receiving the SCI. The communication data are retransmitted at this time.

In a possible implementation, when the multicast transmitter performs retransmission, it may multicast the communication data to the plurality of multicast receivers, or transmit the communication data to the target multicast receiver that does not feed any information back and not transmit the communication data to other multicast receivers other than the target multicast receiver or the target multicast receiver that transmits the ACK, so as to increase the transmission efficiency.

At 4065, when the multicast transmitter receives the ACK transmitted by each target multicast receiver in the target subset and does not receive the NACK transmitted by any multicast receiver, the communication data are not retransmitted.

Since the target multicast receiver employs the first feedback mode to give feedback, the multicast transmitter may identify signaling missed detection or data reception errors based on the information fed back by the target multicast receiver and the information fed back by other multicast receivers. By distinguishing the feedback information of the target multicast receiver and the feedback information of other multicast receivers, various situations that occur during the communication process may be determined. It may be further determined whether to retransmit based on different situations, which may not only improve the transmission reliability, but also may reduce the signaling overhead and save communication resources as much as possible With the method provided in embodiments of the disclosure, the target subset is determined from the set of multicast receiving devices. The target subset includes the at least one target multicast receiver in the plurality of multicast receivers. The first control signaling is transmitted. Therefore, the target multicast receiver in the target subset may be instructed to employ the first feedback mode to give feedback, and other multicast receivers may be instructed to employ the second feedback mode to give feedback. Compared with all multicast receivers employing the first feedback mode, the problem of communication data loss due to incorrect reception of the SCI may be effectively avoided, and the transmission reliability may be improved. Compared with all multicast receivers employing the second feedback mode, the signaling overhead may be reduced and feedback resources may be saved.

In addition, when the channel quality measured by the multicast receiver is lower than the second preset channel quality, the channel quality is reported to the multicast transmitter, which enables the multicast transmitter to acquire the channel quality of the multicast receiver with the lower channel quality, and also may reduce the signaling overhead.

In addition, considering that the channel quality of the uplink channel may represent the channel quality of the downlink channel, the channel quality between each multicast receiver and the multicast transmitter may be acquired by measuring the channel quality at the multicast transmitter. The accurate channel quality may be acquired, and the multicast receiver does not need to report the channel quality, which may reduce the signaling overhead.

In addition, the multicast transmitter determines whether to retransmit based on the information fed back by the target multicast receiver and the information fed back by other multicast receivers. By distinguishing the feedback information from the target multicast receiver and the feedback information from other multicast receivers, various situations in the communication process may be determined. It may be determined whether to perform retransmission based on different situations, which may not only improve the transmission reliability, but also reduce the signaling overhead as much as possible and save communication resources.

Figure 5:
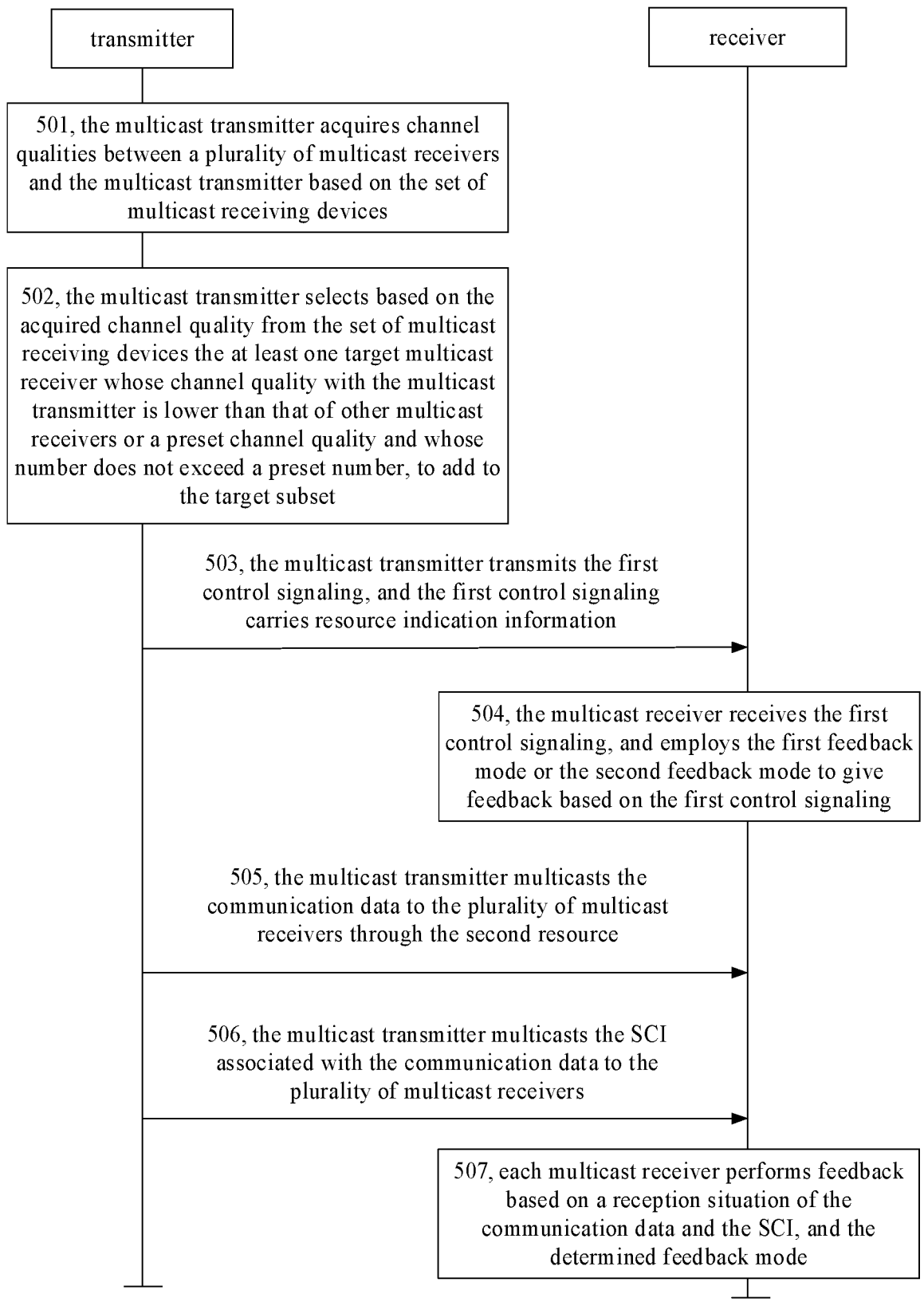
FIG. 5 is a flow chart of a communication feedback method according to an exemplary embodiment of the disclosure.

FIG. 5 is a flow chart of a communication feedback method according to an exemplary embodiment of the disclosure, which may be applicable to a multicast transmitter and a multicast receiver. Referring to FIG. 5, the method includes the following.

At block 501, the multicast transmitter acquires channel qualities between a plurality of multi cast receivers and the multi cast transmitter based on the set of multicast receiving devices.

At block 502, the multicast transmitter selects based on the acquired channel quality from the set of multicast receiving devices the at least one target multicast receiver whose channel quality with the multicast transmitter is lower than that of other multicast receivers or a preset channel quality and whose number does not exceed a preset number, to add to the target subset.

The actions at blocks 501-502 are similar to the above-mentioned actions at blocks 401-402, which may not be repeated herein.

At block 503, the multicast transmitter transmits the first control signaling, and the first control signaling carries resource indication information.

The resource indication information is for indicating the first resource for at least one target multicast receiver to transmit feedback information. The resource indication information includes but is not limited to the following two situations at 5031 and 5032.

At 5031, the resource indication information includes the first resource for the at least one target multicast receiver to transmit feedback information. The target multicast receiver may directly determine the first resource used when transmitting feedback information based on the resource indication information.

In a possible implementation, the multicast transmitter may separately transmit the first control signaling to each target multicast receiver, and each first control signaling carries the first resource of each target multicast receiver.

In another possible implementation, the multicast transmitter may multicast the same first control signaling to at least one target multicast receiver, and the first control signaling carries the first resource of each target multicast receiver.

For example, the first control signaling carries the corresponding relationship between the device identifier of each target multicast receiver and the first resource. When each target multicast receiver receives the first control signaling, it determines the first resource corresponding to the local device based on the corresponding relationship.

In the above two possible implementations, the multicast transmitter may additionally transmit the control signaling to other multicast receivers, and the control signaling carries third resources for the other multicast receivers to transmit feedback information.

In another possible implementation, the multicast transmitter may multicast the same first control signaling to each multicast receiver, and the first control signaling carries the first resource of each target multicast receiver. In addition, third resources of other multicast receivers may also be carried.

At 5032, the resource indication information includes an offset between the first resource and a designated resource, the designated resource being a second resource for the multicast transmitter to transmit communication data, or includes a third resource for other multicast receiver to transmit feedback information.

In a possible implementation, the resource indication information includes the offset between the first resource and the second resource. When the target multicast receiver receives the first control signaling, it acquires the offset carried in the first control signaling. When the SCI is received, the second resource carried in the SCI is acquired. The first resource may be acquired based on the offset and the second resource.

After that, the target multicast receiver may receive the communication data transmitted by the multicast transmitter through the second resource, and transmit feedback information to the multicast transmitter through the first resource.

The offset may include at least one of a time resource offset and a frequency resource offset. For example, if the time resource offset is a and the frequency resource offset is 0, after the target multicast receiver receives the communication data through the second resource, it may transmit the feedback information to the multicast transmitter on the $a^{th}$ time resource and the same frequency resource as the communication data.

In another possible implementation, the resource indication information includes the offset between the first resource and the third resource. When the target multicast receiver receives the first control signaling, it acquires the offset carried in the first control signaling, and the first resource may be acquired based on the offset and the third resource.

The third resource may be carried in the control signaling multicasted by the multicast transmitter to the plurality of multicast receivers. The control signaling may be the above-mentioned first control signaling, or may be another control signaling transmitted separately other than the first control signaling.

It should be noted that the above-mentioned first resource, second resource, and third resource may be arbitrarily configured by the multicast transmitter, or arbitrarily configured by the base station. Each resource is determined by the time domain resource, frequency domain resource and/or code domain resource in the communication system, and the time domain resource, frequency domain resource and/or code domain resource may be configured or changed based on requirements. For example, the time domain resource may be a time slot, a frame, a subframe, a symbols, etc., and the frequency domain resource may be a subcarrier, a bandwidth parts, etc.

In order to distinguish and manage the resources of the plurality of multicast receivers for transmitting feedback information, the arrangement order of the plurality of multicast receivers may be determined, and resources are shifted in sequence based on the arrangement order to acquire the resource of each multicast receiver. The arrangement order of the plurality of multicast receivers may be based on an order of channel qualities of the plurality of multicast receivers from high to low or from low to high, or based on the sequence of device identifiers of the plurality of multicast receiver, or other orders.

The manner in which the multicast transmitter transmits the control signaling is similar to the foregoing action at 5031, which may not be repeated herein. Then, when the multicast transmitter transmits the same first control signaling to at least one target multicast receiver, the first control signaling may carry the plurality of offsets, and the plurality of offsets are arranged based on the arrangement order of the plurality of target multicast receiver. That is, the correspondence between each target multicast receiver and the offset may be provided. When the target multicast receiver receives the first control signaling, it determines the corresponding offset based on the local arrangement order and determines the first resource based on the offset and the designated resource.

In order to avoid mutual interference between resources, in a possible implementation, first resources for different target multicast receivers to transmit feedback information are orthogonal to avoid the mutual interference of information fed back by different target multicast receivers.

In another possible implementation, the first resource for the target multicast receiver to transmit feedback information is orthogonal to the third resource for the other multicast receiver to transmit feedback information, so as to prevent the mutual interference of information fed back by the target multicast receiver and information fed back by the other multicast receiver.

In another possible implementation, third resources for other multicast receivers to transmit feedback information are the same, so that the plurality of other multicast receivers may share resources. As long as one other multicast receiver transmits the NACK through the resource, the multicast transmitter may be notified that the communication data may not be received correctly, and other multicast receivers may not need to transmit the NACK through this resource.

At block 504, the multicast receiver receives the first control signaling, and employs the first feedback mode or the second feedback mode to give feedback based on the first control signaling.

At block 505, the multicast transmitter multicasts the communication data to the plurality of multicast receivers through the second resource.

At block 506, the multicast transmitter multicasts the SCI associated with the communication data to the plurality of multicast receivers.

The SCI may be transmitted through any resource configured by the multicast transmitter or the base station, and the SCI carries the second resource. Each multicast receiver may receive the SCI, determine the second resource for transmitting the communication data, and receive the communication data through the second resource.

At block 507, each multicast receiver performs feedback based on a reception situation of the communication data and the SCI, and the determined feedback mode.

This communication feedback includes the following.

At 5071, when the multicast receiver does not correctly receive the SCI, the multicast receiver may not feed any information back to the multicast transmitter.

At 5072, when the multicast receiver correctly receives the SCI, the multicast receiver may receive the communication data through the second resource, and perform feedback.

2-1, when the target multicast receiver correctly receives the communication data, the target multicast receiver feeds the ACK back to the multicast transmitter through the first resource; when the target multicast receiver does not correctly receive the communication data, the target multicast receiver feeds the NACK back to the multicast transmitter through the first resource.

2-2, when other multicast receivers correctly receive the communication data, other multicast receivers may not feed any information back; when other multicast receivers do not correctly receive the communication data, other multicast receivers may feed NACK back to the multicast transmitter through the third resources.

In a possible implementation, when the plurality of other multicast receivers share the third resource, and one of the other multicast receivers does not correctly receive the communication data, it may feed the NACK back to the multicast transmitter through the third resource.

The multicast transmitter may detect the first resource, receive information fed back by the target multicast receiver through the first resource, and also detect the third resource, and receive information fed back by other multicast receivers through the third resource. It may determine whether to retransmit based on the information fed back by the multicast receivers. The retransmission process is similar to the retransmission process in the action at block 406 described above, which may not be repeated herein.

With the method provided in embodiments of the disclosure, the target subset is determined from the set of multicast receiving devices. The target subset includes the at least one target multicast receiver in the plurality of multicast receivers. The first control signaling is transmitted. Therefore, the target multicast receiver in the target subset may be instructed to employ the first feedback mode to give feedback, and other multicast receivers may be instructed to employ the second feedback mode to give feedback. Compared with all multicast receivers employing the first feedback mode, the problem of communication data loss due to incorrect reception of the SCI may be effectively avoided, and the transmission reliability may be improved. Compared with all multicast receivers employing the second feedback mode, the signaling overhead may be reduced and feedback resources may be saved.

In addition, the first resources for different target multicast receivers to transmit feedback information are orthogonal; and/or, the first resource for the target multicast receiver to transmit feedback information is orthogonal to the third resource for the other multicast receiver to transmit feedback information. Therefore, mutual interference between feedback information may be avoided and the accuracy may be improved.

In addition, the resources for other multicast receivers to transmit feedback information are the same, and the resources are shared by other multicast receivers, which may achieve the accurate feedback and save feedback resources.

Figure 6:
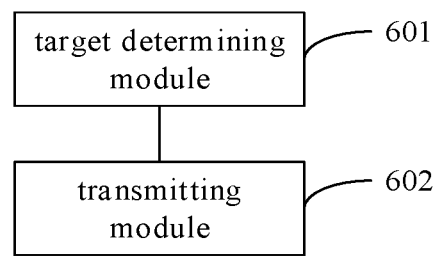
FIG. 6 is a block diagram of a communication feedback apparatus according to an exemplary embodiment of the disclosure.

FIG. 6 is a block diagram of a communication feedback apparatus according to an exemplary embodiment of the disclosure, which may be applicable to the transmitter. Referring to FIG. 6, the apparatus includes a target determining module 601 and a transmitting module 602.

The target determining module 601 is configured to determine a target subset from a set of multicast receiving devices. The set of multicast receiving devices may include a plurality of multicast receivers that receive multicast communication. The target subset may include at least one target multicast receiver in the plurality of multicast receivers.

The transmitting module 602 is configured to transmit a first control signaling. The first control signaling may be for instructing the target multicast receiver in the target subset to employ a first feedback mode to give feedback. The first feedback mode may be for feeding an acknowledgement character ACK back when communication data transmitted by the multicast transmitter is received correctly and for feeding a negative acknowledgement character NACK back when communication data transmitted by the multicast transmitter is not received correctly.

The first control signaling may be further for instructing other multicast receivers outside the target subset to employ a second feedback mode to give feedback. The second feedback mode may be for not feeding back when communication data transmitted by the multicast transmitter is received correctly and for feeding the NACK back when communication data transmitted by the multicast transmitter is not received correctly.

With the apparatus provided in embodiments of the disclosure, the target subset is determined from the set of multicast receiving devices. The target subset includes the at least one target multicast receiver in the plurality of multicast receivers. The first control signaling is transmitted. Therefore, the target multicast receiver in the target subset may be instructed to employ the first feedback mode to give feedback, and other multicast receivers may be instructed to employ the second feedback mode to give feedback. Compared with all multicast receivers employing the first feedback mode, the problem of communication data loss due to incorrect reception of the SCI may be effectively avoided, and the transmission reliability may be improved. Compared with all multicast receivers employing the second feedback mode, the signaling overhead may be reduced and feedback resources may be saved.

In a possible implementation, the transmitting module 602 includes a first transmitting unit and a second transmitting unit.

The first transmitting unit is configured to transmit the first control signaling to each target multicast receiver in the target subset. The first control signaling may be for instructing to employ the first feedback mode.

The second transmitting unit is configured to multicast the first control signaling to the plurality of multicast receivers. The first control signaling may carry a device identifier of the target multicast receiver in the target subset.

In another possible implementation, the first control signaling may carry resource indication information. The resource indication information may be for indicating a first resource for the at least one target multicast receiver to transmit feedback information.

In another possible implementation, the resource indication information may include the first resource for the at least one target multicast receiver to transmit feedback information.

Or the resource indication information may include an offset between the first resource and a designated resource, the designated resource being a second resource for the multicast transmitter to transmit communication data, or may include a third resource for other multicast receiver to transmit feedback information.

In another possible implementation, first resources for different target multicast receivers to transmit feedback information are orthogonal.

In another possible implementation, the first resource for the target multicast receiver to transmit feedback information is orthogonal to the third resource for the other multicast receiver to transmit feedback information.

In another possible implementation, third resources for other multicast receivers to transmit feedback information are the same.

In another possible implementation, the target determining module 601 is configured to select from the set of multicast receiving devices the at least one target multicast receiver whose channel quality with the multicast transmitter is lower than that of other multicast receivers or a preset channel quality and whose number does not exceed a preset number, to add to the target subset.

In another possible implementation, the target determining module 601 includes an acquiring unit and a target determining unit.

The acquiring unit is configured to receive a channel quality report signaling transmitted by at least one multicast receiver of the plurality of multicast receivers, the channel quality report signaling carrying a channel quality between the corresponding multicast receiver and the multicast transmitter; or measure a channel quality between each of the plurality of multicast receivers and the multicast transmitter.

The target determining unit is configured to select based on the acquired channel quality the at least one target multicast receiver whose channel quality with the multicast transmitter is lower than that of other multicast receivers or a first preset channel quality and whose number does not exceed the preset number to add to the target sub set.

In another possible implementation, the channel quality acquiring unit is configured to receive a channel quality report signaling transmitted by at least one multicast receiver of the plurality of multicast receivers, the channel quality report signaling carrying a channel quality between the corresponding multicast receiver and the multicast transmitter; or measure a channel quality between each of the plurality of multicast receivers and the multicast transmitter.

In another possible implementation, the apparatus further includes an acquiring module.

The acquiring module is configured to acquire the preset number or the first preset channel quality predefined in a preset protocol.

The acquiring module is further configured to receive a second control signaling transmitted by a base station. The second control signaling may carry the preset number, or the second control signaling may carry the first preset channel quality.

In another possible implementation, any one of the plurality of multicast receivers is configured to transmit a channel quality report signaling to the multicast transmitter when a channel quality with the multicast transmitter is lower than a second preset channel quality. The channel quality report signaling may carry the channel quality.

The target determining module 601 includes a receiving unit and a target determining unit.

The receiving unit is configured to receive a channel quality report signaling transmitted by at least one multicast receiver of the plurality of multicast receivers.

The target determining unit is configured to add a multicast receiver that does not exceed the preset number in the at least one multicast receiver to the target subset.

It should be noted that when the communication feedback apparatus provided in the above embodiments performs feedback, the division of the above functional modules may be used as an example only. In actual applications, the above function allocation may be completed by different functional modules as needed, namely, the internal structure of the multicast transmitter may be divided into different functional modules to complete all or part of the functions described above. In addition, the communication feedback apparatus provided in the foregoing embodiments and the communication feedback method provided in the foregoing embodiments belong to the same concept, and the specific implementation process is detailed in the method embodiments for the communication feedback apparatus, which may be not repeated herein.

Figure 7:
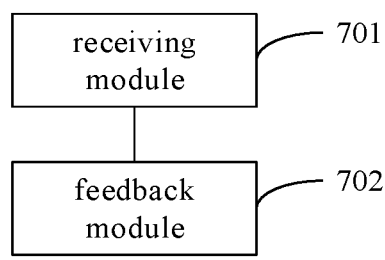
FIG. 7 is a block diagram of a communication feedback apparatus according to an exemplary embodiment of the disclosure.

FIG. 7 is a block diagram of a communication feedback apparatus according to an exemplary embodiment of the disclosure, which may be applicable to the transmitter. The apparatus may include a receiving module 701 and a feedback module 702.

The receiving module 701 is configured to receive a first control signaling transmitted by a multicast transmitter when a second feedback mode is employed by default to give feedback.

The feedback module 702 is configured to employ a first feedback mode or the second feedback mode to give feedback based on the first control signaling.

The first control signaling may be for instructing a target multicast receiver in a target subset to employ the first feedback mode to give feedback. The first feedback mode may be for feeding an acknowledgement character ACK back when communication data transmitted by the multicast transmitter is received correctly and for feeding a negative acknowledgement character NACK back when communication data transmitted by the multicast transmitter is not received correctly.

The first control signaling may be further for instructing other multicast receivers outside the target subset to employ the second feedback mode to give feedback. The second feedback mode may be for not feeding back when communication data transmitted by the multicast transmitter is received correctly and for feeding the NACK back when communication data transmitted by the multicast transmitter is not received correctly.

With the apparatus provided in embodiments of the disclosure, the target subset is determined from the set of multicast receiving devices. The target subset includes the at least one target multicast receiver in the plurality of multicast receivers. The first control signaling is transmitted. Therefore, the target multicast receiver in the target subset may be instructed to employ the first feedback mode to give feedback, and other multicast receivers may be instructed to employ the second feedback mode to give feedback. Compared with all multicast receivers employing the first feedback mode, the problem of communication data loss due to incorrect reception of the SCI may be effectively avoided, and the transmission reliability may be improved. Compared with all multicast receivers employing the second feedback mode, the signaling overhead may be reduced and feedback resources may be saved.

In a possible implementation, the feedback module 702 is configured to employ the first feedback mode to give feedback when the first control signaling is a unicast signaling transmitted by the multicast transmitter.

In another possible implementation, the feedback module 702 includes a first feedback unit and a second feedback unit.

The first feedback unit is configured to employ the first feedback mode to give feedback when the first control signaling is a multicast signaling transmitted by the multicast transmitter and the first control signaling carries a device identifier of the multicast receiver.

The second feedback unit is configured to employ the second feedback mode to give feedback when the first control signaling is the multicast signaling transmitted by the multicast transmitter and the first control signaling does not carry the device identifier of the multicast receiver.

In another possible implementation, the first control signaling may carry resource indication information. The resource indication information may be for indicating a first resource for the target multicast receiver to transmit feedback information. The feedback module 702 includes a first transmitting unit and a second transmitting unit.

The first transmitting unit is configured to transmit the ACK through the first resource when communication data transmitted by the multicast transmitter is correctly received.

The second transmitting unit is configured to transmit the NACK through the first resource when communication data transmitted by the multicast transmitter is not correctly received.

In another possible implementation, the resource indication information may include an offset between the first resource for the target multicast receiver to transmit feedback information and a designated resource, the designated resource being a second resource for the multicast transmitter to transmit communication data, or may include a third resource for other multicast receiver to transmit feedback information. The apparatus includes a determining module.

The determining module is configured to determine the first resource based on the designated resource and the offset.

In another possible implementation, first resources for different target multicast receivers to transmit feedback information are orthogonal.

In another possible implementation, the first resource for the target multicast receiver to transmit feedback information is orthogonal to the third resource for the other multicast receiver to transmit feedback information.

In another possible implementation, third resources for other multicast receivers to transmit feedback information are the same.

In another possible implementation, the apparatus includes a measuring module, a third transmitting module, or a fourth transmitting module.

The measuring module is configured to measure a channel quality between the multicast receiver and the multicast transmitter.

The third transmitting module is configured to transmit a channel quality report signaling to the multicast transmitter. The channel quality report signaling may carry the channel quality.

The fourth transmitting module is configured to transmit a channel quality report signaling to the multicast transmitter when the channel quality is lower than a second preset channel quality. The channel quality report signaling may carry the channel quality.

In another possible implementation, the apparatus further includes a receiving module.

The receiving module is configured to receive a third control signaling transmitted by a base station. The third control signaling may carry the second preset channel quality.

The receiving module is further configured to receive a fourth control signaling transmitted by the multicast transmitter. The fourth control signaling may carry the second preset channel quality.

It should be noted that when the communication feedback apparatus provided in the above embodiments performs feedback, the division of the above functional modules may be used as an example only. In actual applications, the above function allocation may be completed by different functional modules as needed, namely, the internal structure of the multicast receiver may be divided into different functional modules to complete all or part of the functions described above. In addition, the communication feedback apparatus provided in the foregoing embodiments and the communication feedback method provided in the foregoing embodiments belong to the same concept, and the specific implementation process is detailed in the method embodiments for the communication feedback apparatus, which may be not repeated herein.

Figure 8:
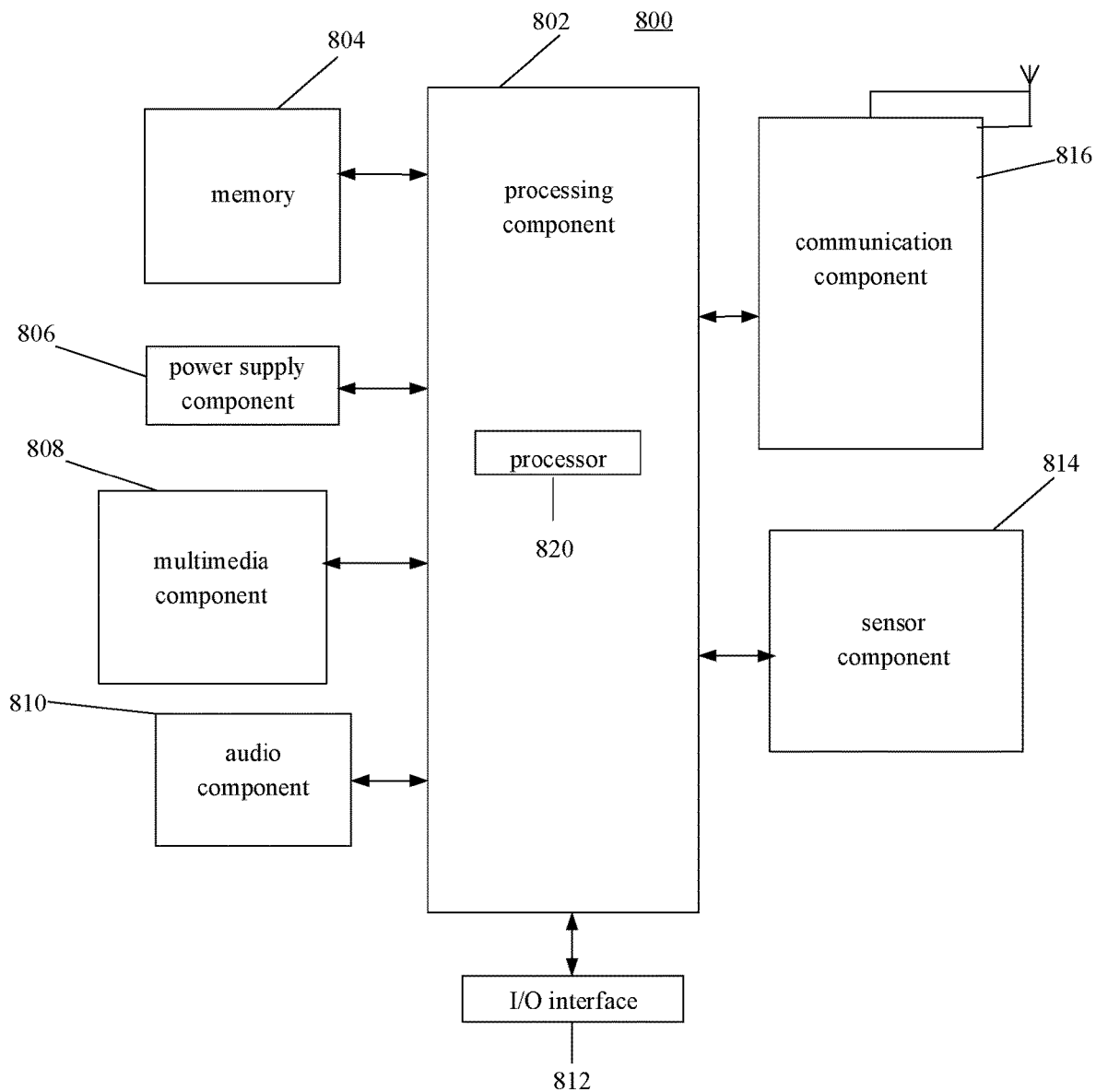
FIG. 8 is a block diagram of a communication device according to an exemplary embodiment of the disclosure.

FIG. 8 is a block diagram of a communication device 800 according to an exemplary embodiment of the disclosure. For example, the communication device 800 may be configured to implement the communication feedback method provided in the above embodiments. Referring to FIG. 8, the 8communication device 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operations of the communication device 800, such as operations associated with display, telephone calls, data communications, camera operations, and recording operations. The processing component 802 may include one or more processors 820 to execute instructions to complete all or part of the steps of the above-described methods. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data to support operations on the communication device 800. Examples of these data include instructions for any application or method operated on the communication device 800, contact data, phone book data, messages, pictures, videos, etc. The memory 804 may be implemented by any type of volatile or non-volatile storage device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply component 806 provides power to various components of the communication device 800. The power supply component 806 may include a power management system, one or more power supplies, and other components associated with generation, management, and distribution of power for the communication device 800.

The multimedia component 808 includes a screen providing an output interface between the aforementioned communication device 800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The above-mentioned touch sensor may not only sense the boundary of the touch or sliding action, but also detect the duration and pressure related to the above-mentioned touch or sliding operation. In some embodiments, the multimedia component 808 includes a front camera and/or a rear camera. When the device 800 is in an operation mode, such as a shooting mode or a video mode, the front camera and/or the rear camera can receive external multimedia data. Each front camera and rear camera may be a fixed optical lens system or have focal length and optical zooming capabilities.

The audio component 810 is configured to output and/or input audio signals. For example, the audio component 810 includes a microphone (MIC). When the 8communication device 800 is in an operation mode, such as a call mode, a recording mode, and a voice recognition mode, the microphone is configured to receive external audio signals. The received audio signals may be further stored in the memory 804 or transmitted via the communication component 816. In some embodiments, the audio component 810 further includes a speaker for outputting audio signals.

The I/O interface 812 provides an interface between the processing component 802 and a peripheral interface module. The above-mentioned peripheral interface module may be a keyboard, a click wheel, a button, and the like. These buttons may include, but are not limited to: home button, volume button, start button, and lock button.

The sensor component 814 includes one or more sensors, which are used to provide the communication device 800 with various aspects of status assessment. For example, the sensor component 814 can detect the on/off status of the device 800 and the relative positioning of the components. For example, the above components are the display and keypad of the communication device 800. The sensor component 814 can also detect change in the position of the communication device 800 or one component of the communication device 800, presence or absence of contact between the user and the communication device 800, orientation or acceleration/deceleration of the communication device 800, and change in the temperature of the communication device 800. The sensor component 814 may include a proximity sensor configured to detect the presence of nearby objects when there is no physical contact. The sensor component 814 may also include a light sensor, such as a CMOS or CCD image sensor, for use in imaging applications. In some embodiments, the sensor component 814 may also include an acceleration sensor, a gyroscope sensor, a magnetic sensor, a pressure sensor or a temperature sensor.

The communication component 816 is configured to facilitate wired or wireless communication between the communication device 800 and other devices. The communication device 800 can access a wireless network based on a communication standard, such as Wi-Fi, 2G, 3G, or a combination thereof. In one exemplary embodiment, the communication component 816 receives a broadcast signal or broadcast related information from an external broadcast management system via a broadcast channel. In one exemplary embodiment, the aforementioned communication component 816 further includes a near field communication (NFC) module to facilitate short-range communication.

In an exemplary embodiment, the communication device 800 may be implemented by one or more of application specific integrated circuits (ASIC), digital signal processors (DSP), digital signal processing devices (DSPD), programmable logic devices (PLD), field programmable gate arrays (FPGA), controllers, microcontrollers, microprocessors or other electronic components, to execute the above-described methods.

In an exemplary embodiment, a non-transitory computer-readable storage medium including instructions is also provided, such as the memory 804 including instructions, the aforementioned instructions can be executed by the processor 820 of the 8communication device 800 to complete the methods. For example, the non-transitory computer-readable storage medium may be ROM, random access memory (RAM), CD-ROM, magnetic tape, floppy disk, and optical data storage device, etc.

Those of ordinary skill in the art may understand that all or part of the actions may be implemented by hardware, or by driving the related hardware through the programs. The programs may be stored in a machine-readable storage medium. The aforementioned storage medium may be a read-only memory, a magnetic disk or an optical disk, etc.

The above are only some optional embodiments of the disclosure. Any modification, equivalent replacement, improvement, etc. made within the spirit and principle of the embodiments of the disclosure shall be included in the scope of protection of the disclosed embodiments.

What is claimed is:

1. A communication feedback method, applicable to a multicast transmitter, comprising:
determining a target subset from a set of multicast receiving devices, the set of multicast receiving devices comprising a plurality of multicast receivers that receive multicast communication, the target subset comprising at least one target multicast receiver in the plurality of multicast receivers; and
transmitting a first control signaling, wherein the first control signaling is for instructing the target multicast receiver in the target subset to employ a first feedback mode to give feedback, the first feedback mode for feeding an acknowledgement character ACK back when communication data transmitted by the multicast transmitter is received correctly and for feeding a negative acknowledgement character NACK back when communication data transmitted by the multicast transmitter is not received correctly;
wherein the first control signaling is further for instructing other multicast receivers outside the target subset to employ a second feedback mode to give feedback, and the second feedback mode is for not feeding back when communication data transmitted by the multicast transmitter is received correctly and for feeding the NACK back when communication data transmitted by the multicast transmitter is not received correctly.

2. The method as claimed in claim 1, wherein the transmitting the first control signaling comprises:
transmitting the first control signaling to each target multicast receiver in the target subset, the first control signaling for instructing to employ the first feedback mode; or
multicasting the first control signaling to the plurality of multicast receivers, the first control signaling carrying a device identifier of the target multicast receiver in the target sub set.

3. The method as claimed in claim 1, wherein the first control signaling carries resource indication information, the resource indication information for indicating a first resource for the at least one target multicast receiver to transmit feedback information.

4. The method as claimed in claim 3, wherein the resource indication information comprises the first resource for the at least one target multicast receiver to transmit feedback information; or
the resource indication information comprises an offset between the first resource and a designated resource, the designated resource being a second resource for the multicast transmitter to transmit communication data, or comprises a third resource for other multicast receiver to transmit feedback information.

5. The method as claimed in claim 3, wherein,
first resources are for different target multicast receivers to transmit feedback information are orthogonal; and/or,
the first resource for the target multicast receiver to transmit feedback information being orthogonal to the third resource for the other multicast receiver to transmit feedback information; and/or,
third resources are for other multicast receivers to transmit feedback information are the same.

6. The method as claimed in claim 1, wherein the determining the target subset from the set of multicast receiving devices comprises:
selecting from the set of multicast receiving devices the at least one target multicast receiver whose channel quality with the multicast transmitter is lower than that of other multicast receivers or a preset channel quality and whose number does not exceed a preset number, to add to the target subset.

7. The method as claimed in claim 6, wherein the selecting the at least one target multicast receiver whose channel quality with the multicast transmitter is lower than that of other multicast receivers or the preset channel quality and whose number does not exceed the preset number to add to the target subset, comprises:
receiving a channel quality report signaling transmitted by at least one multicast receiver of the plurality of multicast receivers, the channel quality report signaling carrying a channel quality between the corresponding multicast receiver and the multicast transmitter; or
measuring a channel quality between each of the plurality of multicast receivers and the multicast transmitter; and
selecting, based on the acquired channel quality, the at least one target multicast receiver whose channel quality with the multicast transmitter is lower than that of other multicast receivers or a first preset channel quality and whose number does not exceed the preset number to add to the target subset.

8. The method as claimed in claim 7, further comprising:
acquiring the preset number or the first preset channel quality predefined in a preset protocol; or,
receiving a second control signaling transmitted by a base station, the second control signaling carrying the preset number, or the second control signaling carrying the first preset channel quality.

9. The method as claimed in claim 6, wherein any one of the plurality of multicast receivers is configured to transmit a channel quality report signaling to the multicast transmitter when a channel quality with the multicast transmitter is lower than a second preset channel quality, the channel quality report signaling carrying the channel quality; and
wherein the selecting the at least one target multicast receiver whose channel quality with the multicast transmitter is lower than that of other multicast receivers or the preset channel quality and whose number does not exceed the preset number to add to the target subset, comprises:
receiving a channel quality report signaling transmitted by at least one multicast receiver of the plurality of multicast receivers; and
adding a multicast receiver that does not exceed the preset number in the at least one multicast receiver to the target subset.

10. A non-transitory computer-readable storage medium, on which at least one signaling is stored, wherein the signaling when being executed by a processor, implements actions of the communication feedback method according to claim 1.

11. A communication feedback method, applicable to a multicast receiver, comprising:
receiving a first control signaling transmitted by a multicast transmitter when a second feedback mode is employed by default to give feedback; and
employing a first feedback mode or the second feedback mode to give feedback based on the first control signaling;
the first control signaling for instructing a target multicast receiver in a target subset to employ the first feedback mode to give feedback, the first feedback mode for feeding an acknowledgement character ACK back when communication data transmitted by the multicast transmitter is received correctly and for feeding a negative acknowledgement character NACK back when communication data transmitted by the multicast transmitter is not received correctly;
the first control signaling further for instructing other multicast receivers outside the target subset to employ the second feedback mode to give feedback, the second feedback mode for not feeding back when communication data transmitted by the multicast transmitter is received correctly and for feeding the NACK back when communication data transmitted by the multicast transmitter is not received correctly.

12. The method as claimed in claim 11, wherein the employing the first feedback mode or the second feedback mode to give feedback based on the first control signaling comprises:
employing the first feedback mode to give feedback when the first control signaling is a unicast signaling transmitted by the multicast transmitter.

13. The method as claimed in claim 11, wherein the employing the first feedback mode or the second feedback mode to give feedback based on the first control signaling comprises:
employing the first feedback mode to give feedback when the first control signaling is a multicast signaling transmitted by the multicast transmitter and the first control signaling carries a device identifier of the multicast receiver; and
employing the second feedback mode to give feedback when the first control signaling is the multicast signaling transmitted by the multicast transmitter and the first control signaling does not carry the device identifier of the multicast receiver.

14. The method as claimed in claim 11, wherein the first control signaling carries resource indication information, the resource indication information for indicating a first resource for the target multicast receiver to transmit feedback information; and
employing the first feedback mode to give feedback comprises:
transmitting the ACK through the first resource when communication data transmitted by the multicast transmitter is correctly received; and
transmitting the NACK through the first resource when communication data transmitted by the multicast transmitter is not correctly received.

15. The method as claimed in claim 14, wherein the resource indication information comprises an offset between the first resource for the target multicast receiver to transmit feedback information and a designated resource, the designated resource being a second resource for the multicast transmitter to transmit communication data, or comprises a third resource for other multicast receiver to transmit feedback information;
and the method further comprises:
determining the first resource based on the designated resource and the offset.

16. The method as claimed in claim 11, wherein,
first resources are for different target multicast receivers to transmit feedback information are orthogonal; and/or,
the first resource for the target multicast receiver to transmit feedback information being orthogonal to the third resource for the other multicast receiver to transmit feedback information; and/or,
third resources are for other multicast receivers to transmit feedback information are the same.

17. The method as claimed in claim 11, further comprising:
measuring a channel quality between the multicast receiver and the multicast transmitter;
transmitting a channel quality report signaling to the multicast transmitter, the channel quality report signaling carrying the channel quality; or,
transmitting a channel quality report signaling to the multicast transmitter when the channel quality is lower than a second preset channel quality, the channel quality report signaling carrying the channel quality.

18. The method as claimed in claim 17, further comprising:
receiving a third control signaling transmitted by a base station, the third control signaling carrying the second preset channel quality; or,
receiving a fourth control signaling transmitted by the multicast transmitter, the fourth control signaling carrying the second preset channel quality.

19. A multicast receiver, comprising:
a processor;
a memory for storing signalings executable by the processor;

wherein the processor is configured to: perform the method according to claim 11.

20. A multicast transmitter, comprising:

a processor;

a memory for storing signalings executable by the processor;

wherein the processor is configured to:

determine a target subset from a set of multicast receiving devices, the set of multicast receiving devices comprising a plurality of multicast receivers that receive multicast communication, the target subset comprising at least one target multicast receiver in the plurality of multicast receivers; and transmit a first control signaling, the first control signaling for instructing the target multicast receiver in the target subset to employ a first feedback mode to give feedback, the first feedback mode for feeding an acknowledgement character ACK back when communication data transmitted by the multicast transmitter is received correctly and for feeding a negative acknowledgement character NACK back when communication data transmitted by the multicast transmitter is not received correctly;

the first control signaling further for instructing other multicast receivers outside the target subset to employ a second feedback mode to give feedback, the second feedback mode for not feeding back when communication data transmitted by the multicast transmitter is received correctly and for feeding the NACK back when communication data transmitted by the multicast transmitter is not received correctly.

* * * * *